(12) United States Patent
Changlani et al.

(10) Patent No.: US 11,405,084 B1
(45) Date of Patent: Aug. 2, 2022

(54) SOUNDING FOR UPLINK MULTI-USER TRANSMISSION BEAMFORMING IN WIRELESS NETWORKS

(71) Applicant: HEWLETT PACKARD ENTERPRISE DEVELOPMENT LP, Houston, TX (US)

(72) Inventors: Nitin A. Changlani, Santa Clara, CA (US); Eldad Perahia, Park City, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/246,345

(22) Filed: Apr. 30, 2021

(51) Int. Cl.
*H04B 7/06* (2006.01)
*H04W 72/04* (2009.01)
*H04L 5/00* (2006.01)
*H04B 7/0413* (2017.01)

(52) U.S. Cl.
CPC ......... *H04B 7/0617* (2013.01); *H04B 7/0619* (2013.01); *H04L 5/0048* (2013.01); *H04W 72/0453* (2013.01); *H04B 7/0413* (2013.01); *H04L 5/0035* (2013.01)

(58) Field of Classification Search
CPC .. H04B 7/0413; H04B 7/0617; H04B 7/0619; H04L 5/0035; H04L 5/0048; H04W 72/0453
See application file for complete search history.

(56) References Cited

U.S. PATENT DOCUMENTS

| 10,389,425 B2 | 8/2019 | Zhang |
| 10,587,381 B2 | 3/2020 | Chun et al. |
| 2013/0286959 A1 | 10/2013 | Lou et al. |
| 2016/0330732 A1* | 11/2016 | Moon ................ H04B 7/0619 |
| 2018/0212738 A1* | 7/2018 | Chun ................ H04W 84/12 |
| 2020/0112350 A1 | 4/2020 | Yang et al. |
| 2020/0153491 A1* | 5/2020 | Yang ................ H04L 25/0242 |
| 2020/0305231 A1* | 9/2020 | Sadeghi ............. H04W 4/023 |

FOREIGN PATENT DOCUMENTS

WO   WO-2017022945   2/2017

OTHER PUBLICATIONS

Ma, X.; Improving Throughput and Efficiency for WLAN: Sounding, Grouping, Scheduling, (Research Paper); Sep. 22, 2016; 145 pgs.; https://vtechworks.lib.vt.edu/bitstream/handle/10919/73238/Ma_X_D_2016.pdf; Blacksburg; Virginia.

* cited by examiner

*Primary Examiner* — David B Lugo
(74) *Attorney, Agent, or Firm* — Sheppard Mullin Richter & Hampton LLP

(57) ABSTRACT

Systems and methods are provided for transmitting, by an access point, a trigger frame to a plurality of stations on a network. The trigger frame can be associated with a start of a sounding procedure for the plurality of stations to uplink (UL) beamform with the access point. A corresponding response frame can be received by the access point from each station of the plurality of stations. The corresponding response frame can be synchronized with other response frames in reception time. A beamforming feedback can be generated for the plurality of stations. At least a portion of the beamforming feedback can be transmitted to at least one station of the plurality of stations. A data transmission from the at least one station can be beamformed based on the portion of the beamforming feedback.

20 Claims, 14 Drawing Sheets

SOUNDING FOR UPLINK MULTI-USER TRANSMISSION BEAMFORMING IN WIRELESS NETWORKS

BACKGROUND

New standards and protocols in Wi-Fi 5 and Wi-Fi 6 (also known as 802.11ax) have opened new possibilities of more streamlined and improved communications. Particular capabilities implemented in these wireless standards include MU-MIMO (Multi-User Multiple Input Multiple Output) and OFDMA (Orthogonal Frequency Division Multiple Access). MU-MIMO was first developed as part of Wi-Fi 5 and includes the ability to simultaneously transmit signals to spatially diverse locations. In Wi-Fi 6, MU-MIMO further supports up to eight client devices in one group instead of four clients, and can be implemented on the uplink, from client devices to network devices such as access points and routers.

Meanwhile, OFDMA divides an available channel bandwidth into several mutual orthogonal subcarriers or resource units (RUs) and allows multiple streams to be transmitted simultaneously. Both MU-MIMO and OFDMA have been combined with beamforming in order to selectively focus signals onto a receiver in a particular direction, which increases power spectral density, signal-to-noise ratio, and data rates. Beamforming is generally applicable when a number of antennae of client devices is approximately equal to a number of antennae at network devices. Due to network devices traditionally having more antennae compared to client devices, beamforming in conjunction with MU-MIMO and OFDMA has generally focused on downlink transmission, which is from the network devices to the client devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A illustrates a schematic diagram of an uplink transmission beamforming system that includes one access point as a beamformee. FIG. 1B illustrates a schematic diagram of an uplink transmission beamforming system that includes multiple access points as beamformees. FIG. 1C illustrates a schematic diagram of an uplink transmission beamforming system that includes a mesh network.

FIG. 3A illustrates a sounding procedure in which each beamformer transmits a null data packet (NDP) in response to a trigger frame from a beamformee. FIG. 3B illustrates a sounding procedure in which each beamformer transmits a null data packet announcement (NDPA) prior to transmitting a NDP.

Figure 1A:
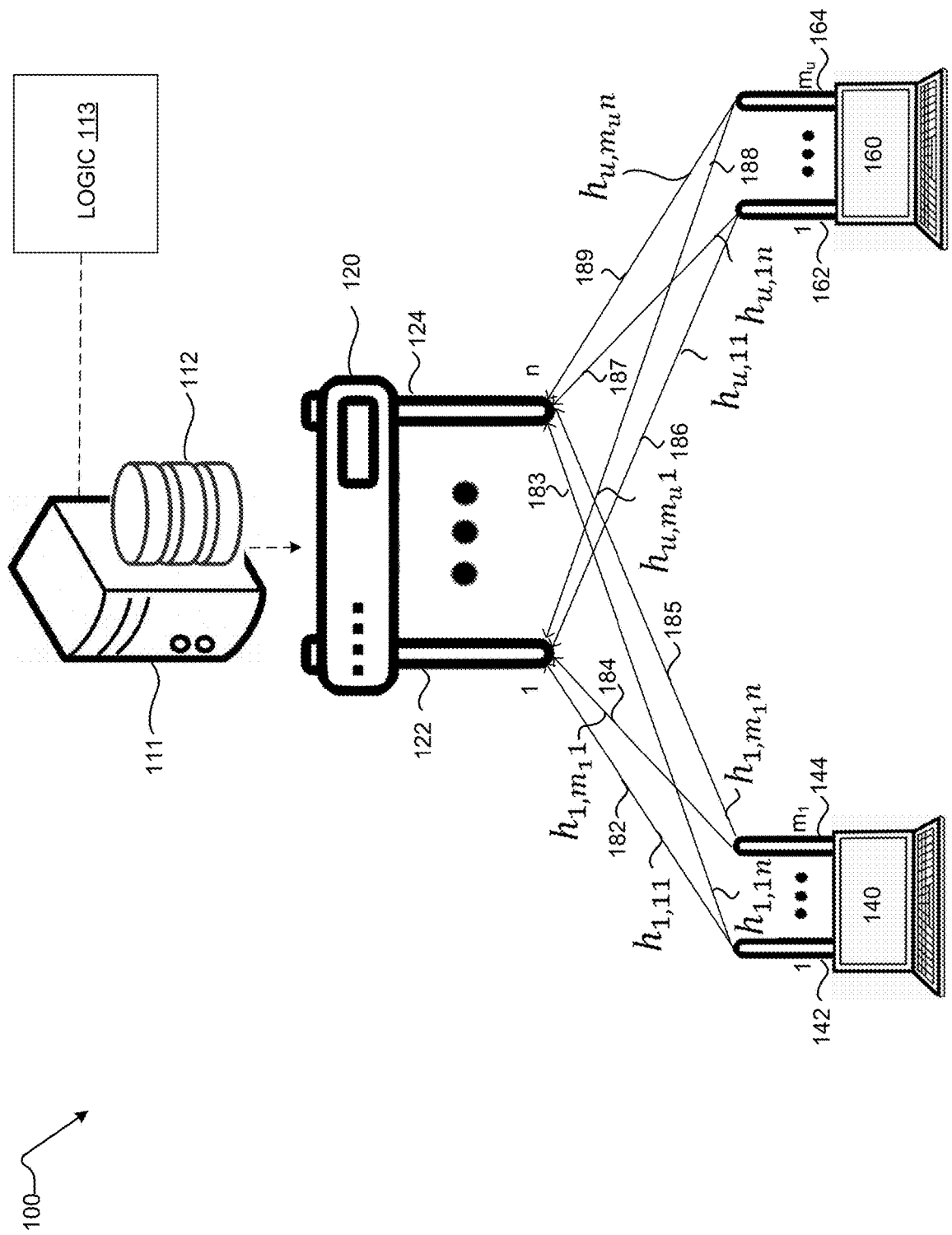
FIGS. 1A-1C are exemplary illustrations of computing systems that perform transmit beamforming on an uplink, according to embodiments described in the present disclosure. In particular.

The figures are not exhaustive and do not limit the present disclosure to the precise form disclosed.

DETAILED DESCRIPTION

Beamforming, which concentrates or focuses a signal of a beamformer at an intended location of a receiver, or beamformee, has traditionally been implemented in downlink transmissions due to differences in form factor between beamformer network devices (e.g., access points) and beamformee stations (e.g., client devices). Downlink beamforming allows a network device to effectively concentrate its signal at a client device to provide better signal quality, signal to noise ratio (SNR), and greater throughput. While downlink beamforming has been widely adopted, the converse scenario of uplink beamforming, which implements the client devices as beamformers and the network device as a beamformee, has not been adopted much, if at all. This lack of adoption of uplink beamforming has been, at least in part, caused by disproportionate resources at a network device compared to those at a client device. Herein, UL refers to transmissions from a client device to a network device and DL refers to transmissions from the network device to a client device.

In particular, network devices typically have greater resources, memory access, and computational and electrical power, as well as more antennae compared to client devices. Because a network device typically has a capacity to transmit with more antennae, the benefits of DL beamforming from a network device perspective has been greater than UL beamforming from a client device perspective. For instance, UL beamforming may not be beneficial when a client device has fewer antennae than a network device (i.e., the network device has more antennae than the client device). Further, under conventional approaches, UL beamforming for each client device can cause a network device to incur overhead costs of individually handling beamforming requests, which can outweigh benefits of UL beamforming.

However, the proliferation of Wi-Fi 6 uplink (UL) multi-user (MU) features has opened possibilities of UL beamforming. Thus, client devices may act as beamformers and a network device may act as a beamformee. In particular, a gain from UL beamforming may exceed an overhead cost of performing the uplink beamforming in some scenarios. Such scenarios may involve collectively beamforming signals from different client devices simultaneously.

One challenge of collectively beamforming signals from different client devices stems from the current 802.11 protocol, in which a beamformer is responsible for initiating a channel sounding procedure. In the scenario of UL beamforming, beamformers can include the client devices which can be numerous. Because each client device is independent, each client device may initiate a channel sounding procedure unaware of channel sounding procedures initiated by other client devices. The uncoordinated (e.g., unsynchronized) channel sounding efforts of each client device can greatly consume resources of a network device which must track and handle the multiple individual channel sounding procedures and, thus, cause unacceptable overheads, which may prolong a sounding and/or beamforming process, thus resulting in other undesirable compromises in performance due to factors such as collisions or unsuccessful transmissions. Additionally, each client device sending a sounding frame separately can consume valuable airtime of a network device that can otherwise be used to communicate with each client device. In other words, conventional approaches do not provide a channel sounding procedure with which client devices can coordinate their UL beamforming efforts. Conventional approaches do not provide for reducing such overhead in resources and airtime. Further, conventional approaches do not provide for a mechanism of coordinating UL beamforming for the client devices.

An improved approach rooted in wireless UL MU technology overcomes the foregoing and other disadvantages associated with conventional approaches specifically arising in the realm of wireless UL MU technology. Based on wireless UL MU technology, the present technology provides methods and systems to coordinate UL beamforming for client devices in a synchronized manner to reduce consumption of resources and airtime. The present technology can group client devices in a group and transmit a frame (e.g., a trigger frame) from a network device to the client devices in the group. For instance, the network device can initiate a channel sounding procedure every 500 milliseconds and the client devices in the group can respond to the network device with their sounding frames and in some cases preceded by separate frames containing their respective sounding parameters in a coordinated manner. Based on the sounding parameters, the network device can generate a beamforming feedback report (e.g., antennae weights for each of the client devices) in a collective manner. The antennae weights may indicate amplitude and/or phase changes of signals, or spatial streams, transmitted from the antennae, to broadcast the signals in a particular direction. The network device can provide at least a portion of the beamforming feedback report to each client device. Each client device can configure UL beamforming based on the received portion of the beamforming feedback report. More details describing the present technology are provided below.

FIG. 1A illustrates a schematic diagram of an uplink transmission beamforming system 100. In FIG. 1A, the uplink transmission beamforming system 100 includes a computing system 111 that performs an uplink transmission beamforming protocol on signals as transmitted in a form of data streams or spatial streams (hereinafter "spatial streams") from client devices such as client devices 140, 160, to a network device, such as an access point 120. In particular, the spatial streams may be transmitted from antennae 142, 144 of the client device 140 and antennae 162, 164 of the client device 160 to antennae of the client devices, which include the antennae 122, 124 of the client device 120. Any number of antennae at the client devices, and antennae at the network devices are contemplated. In general, a number of antennae at the network device may be greater than or equal to a total number of streams transmitted collectively at all of the client devices. In some embodiments, a number of antennae at the access point 120 may be n and each client device may include up to m antennae, wherein n and m are positive integers.

In FIG. 1A, for illustrative purposes, the client device 140 is depicted to include antennae denoted as "1" through "$m_1$" and the client device 160 is depicted to include antennae denoted as "1" to "$m_u$." In particular, the subscript denotes an identifier associated with a particular client device. For example, the client device 140 is denoted as client device "1" and the client device 160 is denoted as client device "u." The access point 120 is depicted to include antennae denoted as "1" through "n." Signals transmitted by each of the antennae on the client devices may be affected by the beamforming, and the effect may be dependent on a particular channel that a client device is transmitting a signal through. In general, channel state information (CSI), which includes spatial transfer functions between each antenna and each client device and indicates effects undertaken on signals transmitted by each of the antennae, can be denoted as $h_{x,yz}$, wherein x is an identifier associated with a transmitting client device, y is an identifier associated with an antenna on the transmitting client device, and z is an identifier associated with a receiving antenna, for example, on an access point.

A signal 182 transmitted by the client device "1" (e.g., the client device 140) and by the antenna "1" towards the antenna "1" of the access point 120 (e.g., the antenna 122) may undertake an effect modelled as $h_{1,11}$. A signal 183 transmitted by the client device "1" (e.g., the client device 140) and by the antenna "1" towards the antenna "n" of the access point 120 (e.g., the antenna 124) may undertake an effect modelled as $h_{1,1n}$. A signal 184 transmitted by the client device "1" (e.g., the client device 140) and by the antenna "$m_1$" towards the antenna "1" of the access point 120 (e.g., the antenna 124) may undertake an effect modelled as $h_{1,m_11}$. A signal 185 transmitted by the client device "1" (e.g., the client device 140) and by the antenna "$m_1$" towards the antenna "n" of the access point 120 (e.g., the antenna 124) may undertake an effect modelled as $h_{1,m_1n}$. A signal 186 transmitted by the client device "u" (e.g., the client device 160) and by the antenna "1" towards the antenna "1" of the access point 120 (e.g., the antenna 124) may undertake an effect modelled as $h_{u,11}$. A signal 187 transmitted by the client device "u" (e.g., the client device 160) and by the antenna "1" towards the antenna "n" of the access point 120 (e.g., the antenna 124) may undertake an effect modelled as $h_{u,1n}$. A signal 188 transmitted by the client device "u" (e.g., the client device 160) and by the antenna "$m_u$" towards the antenna "1" of the access point 120 (e.g., the antenna 124) may undertake an effect modelled as $h_{u,m_u1}$. A signal 189 transmitted by the client device "u" (e.g., the client device 160) and by the antenna "$m_u$" towards the antenna "n" of the access point 120 (e.g., the antenna 124) may undertake an effect modelled as $h_{u,m_un}$.

In FIG. 1A, the computing system 111 may include hardware processors that carry out functions of one or more network devices, such as the access point 120. The computing system 111 may control and/or coordinate operations of the access point 120. The computing system 111 may include logic 113 that includes instructions to carry out the functions of the computing system 111, which may include beamforming and sounding functions as described below. Thus, any reference to the access point 120 performing a function may be construed as that function being performed using the logic 113 of the computing system 111. The computing system 111 may be integrated with a database 112 and logic 113 that includes instructions to carry out the functions of the computing system 111. The database 112 may store information such as data of current locations of beamformers (e.g., the client devices 140, 160), historical data about a type or amount of data transmitted from the beamformers, current channels/subchannels, previous channels/subchannels allocated to the beamformers, and a relative frequency during which the beamformers transmit data through the access point 120, compared to other access points. The computing system 111 may access, obtain, or retrieve information from the database 112 in order to carry out beamforming and sounding functions.

Figure 1B:
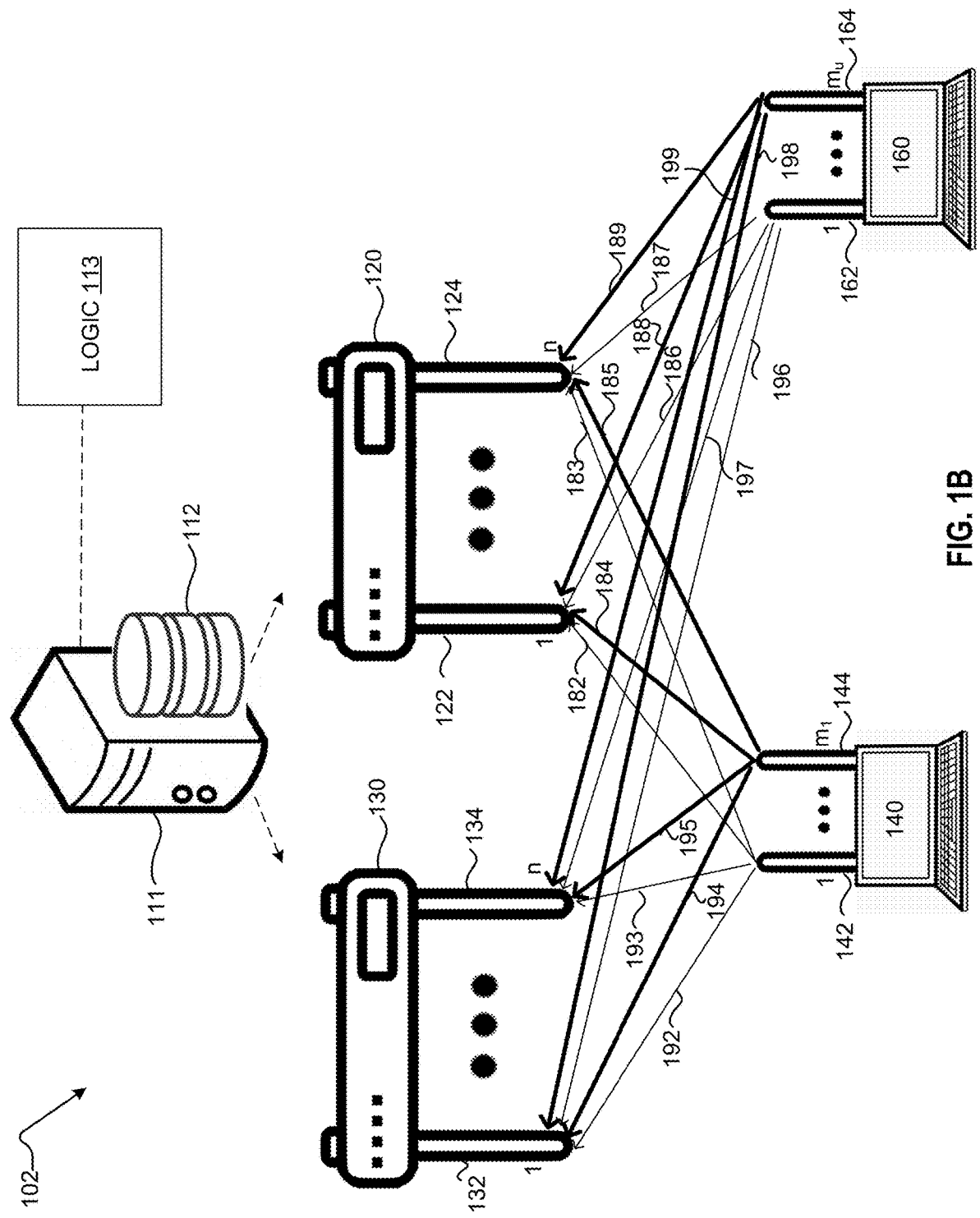

FIG. 1B illustrates a schematic diagram of an uplink transmission beamforming system 102, which may be implemented in a network that includes features from FIG. 1A, and further includes a second access point 130 containing antennae denoted as "1" through "n" (e.g., antennae 132 to 134). In FIG. 1B, as distinguished from FIG. 1A, multiple access points, including the access point 120 and the access point 130 may receive signals. For example, FIG. 1B may include an implementation of cooperative MU MIMO. In FIG. 1B, additional signals received at the access points 120, 130 include signals 192-199, transmitted to the second access point 130. In particular, a signal 192 may be transmitted by the client device "1" (e.g., the client device 140) and by the antenna "1" towards the antenna "1" of the access point 130 (e.g., the antenna 132). A signal 193 may be transmitted by the client device "1" (e.g., the client device 140) and by the antenna "1" towards the antenna "n" of the access point 130 (e.g., the antenna 134). A signal 194 may be transmitted by the client device "1" (e.g., the client device 140) and by the antenna "$m_1$" towards the antenna "1" of the access point 130 (e.g., the antenna 134). A signal 195 may be transmitted by the client device "1" (e.g., the client device 140) and by the antenna "$m_1$" towards the antenna "n" of the access point 130 (e.g., the antenna 134). A signal 196 may be transmitted by the client device "u" (e.g., the client device 160) and by the antenna "1" towards the antenna "1" of the access point 130 (e.g., the antenna 134). A signal 197 may be transmitted by the client device "u" (e.g., the client device 160) and by the antenna "1" towards the antenna "n" of the access point 130 (e.g., the antenna 134). A signal 198 may be transmitted by the client device "u" (e.g., the client device 160) and by the antenna "$m_1$" towards the antenna "1" of the access point 130 (e.g., the antenna 134). A signal 199 may be transmitted by the client device "u" (e.g., the client device 160) and by the antenna "$m_1$" towards the antenna "n" of the access point 130 (e.g., the antenna 134). In some embodiments, the access point 120 and the access point 130 may independently perform beamforming. Besides the additional signals 192-199, similar or same principles described in FIG. 1A may also be applicable to FIG. 1B. The computing system 111 may control or coordinate the functions of the access point 130 in addition to the access point 120. In FIG. 1B, some of the lines indicating streams are shown thicker than other lines solely to more clearly distinguish between different lines.

Figure 1C:
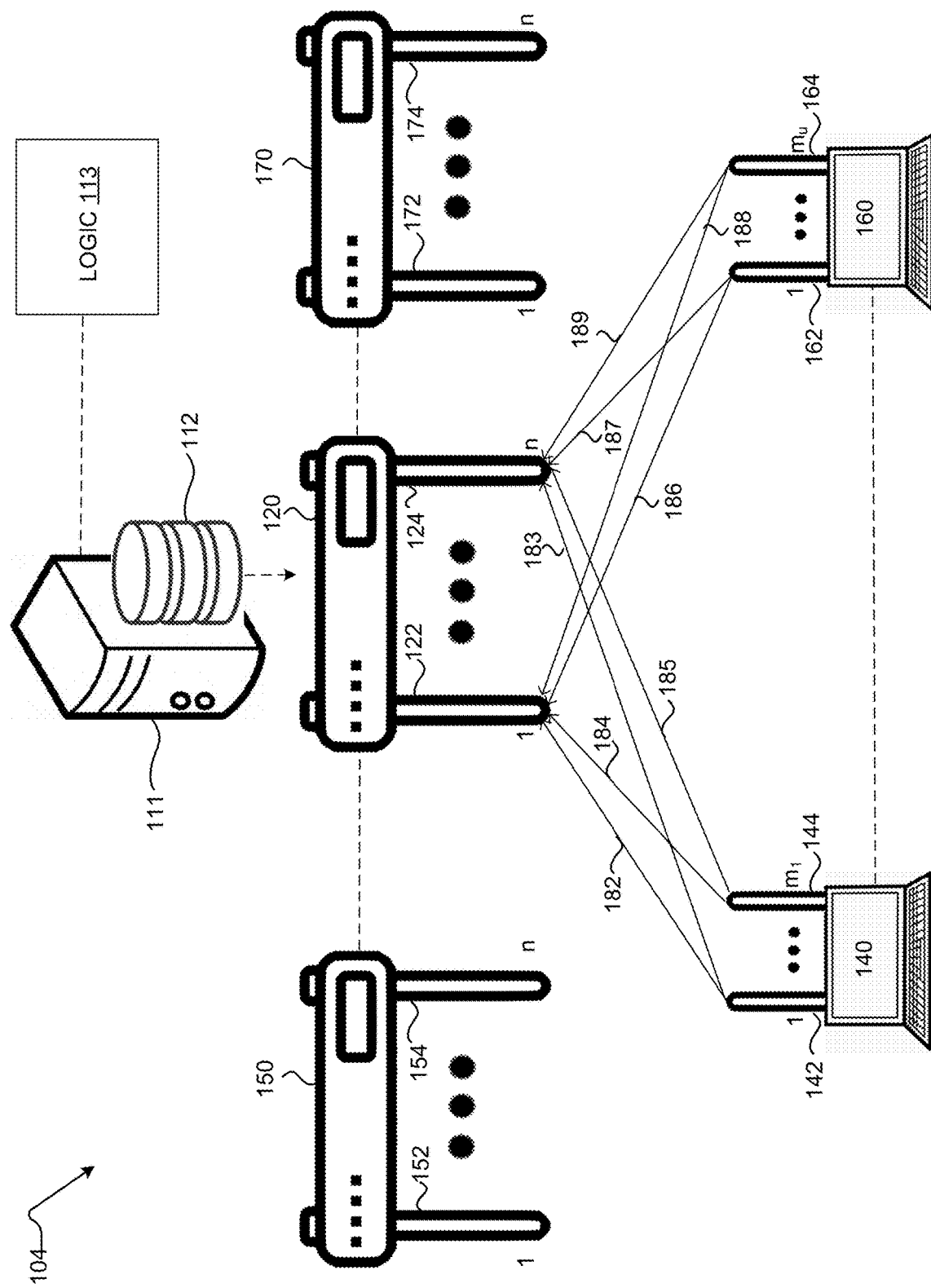

FIG. 1C illustrates a schematic diagram of an uplink transmission beamforming system 104, which may be implemented in a mesh network that includes features from FIG. 1A, and further includes access points 150 and 170. The access points 120, 150, 170 may be connected to one another over wireless links. Each of the access points 150, 170 may individually perform UL MU beamforming in a same or similar manner as that described with respect to the access point 120 in FIG. 1A. The access point 150 may include antennae 152 (labelled as "1") through 154 (labelled as "n"). The access point 170 may include antennae 172 (labelled as "1") through 174 (labelled as "n").

Although not shown for simplicity, signals may be transmitted to each of the access points 150, 170 from other client devices distinct from the client devices 140, 160 in a similar or same manner as that described with respect to the access point 120. In some embodiments, the mesh network may be a multi-radio multi-channel (MRMC) network in which some or all of the access points 120, 150, 170 are equipped with directional or omni-directional antennae.

In some embodiments, either simple random direction beamforming or optimized beamforming between beamformer-beamformee pairs may be implemented. In some embodiments, interference may be further reduced using a MAC (media access control) protocol and/or null steering so that more concurrent transmissions may take place. Additionally, each of the client devices 140, 160 may communicate with each other and with other client devices.

Figure 2A:
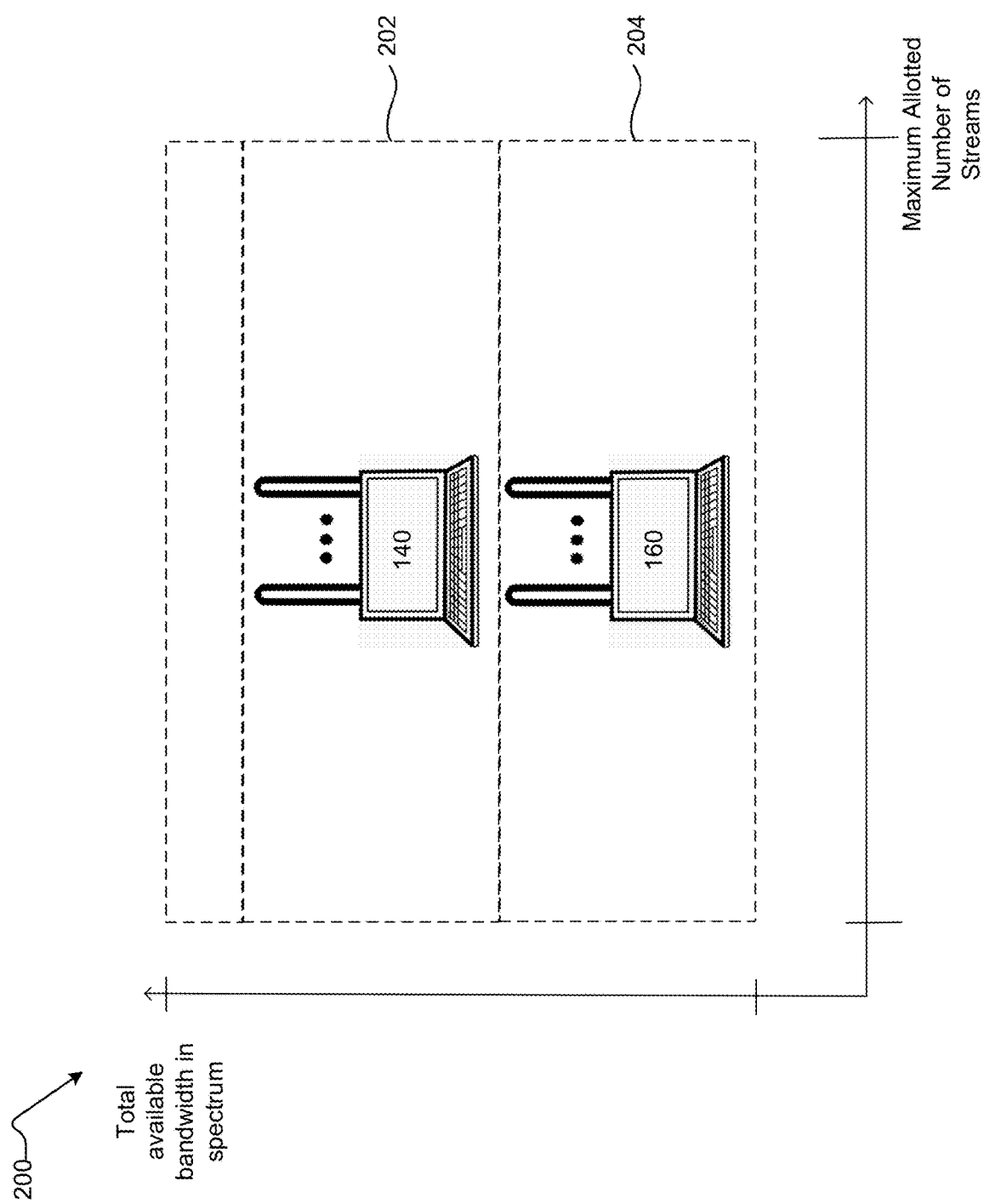
FIG. 2A is an exemplary illustration of MU OFDMA, according to embodiments described in the present disclosure.

Collectively, at the access point 120 of FIG. 1A, the aforementioned signals may be modelled as single-user (SU) MIMO transmissions occurring simultaneously. The access point 120 may individually model the aforementioned signals, while disregarding signals received at other access points. Although the foregoing is described with respect to FIG. 1A, the implementations of FIGS. 1B and 1C are also applicable, in which each access point may model signals received while disregarding signals received at other access points. The signal transmissions may be modelled according to three possible scenarios: MU OFDMA, full bandwidth MU MIMO, or partial bandwidth MU MIMO. In a first scenario 200 of MU OFDMA, each of the SU MIMO transmissions can be divided across different bandwidths, as illustrated in FIG. 2A. A single transmission link may be divided into subchannels, which may further be divided into RUs. For example, the client device 140 may transmit signals over a first bandwidth 202 that can include a first set of subchannels. The client device 160, meanwhile, may transmit signals over a second bandwidth 204 that includes a second set of subchannels. As a particular example, if a single channel width is 80 MHz, the client device 140 may utilize a 20 MHz portion, the client device 160 may utilize a 10 MHz portion, and a remaining 50 MHz portion may be divided between other client devices to transmit data. In some embodiments, each of the client devices 140, 160 may be allocated a same number of allotted channels or spatial streams (hereinafter "spatial streams") over which transmissions may take place, equal to a maximum allotted number of spatial streams by the access point 120. Thus, each of the client devices 140, 160 may utilize up to the maximum allotted number of spatial streams. A number of spatial streams actually utilized by each of the client devices 140, 160 may be independent from a number of spatial streams utilized by any other client device.

Figure 2B:
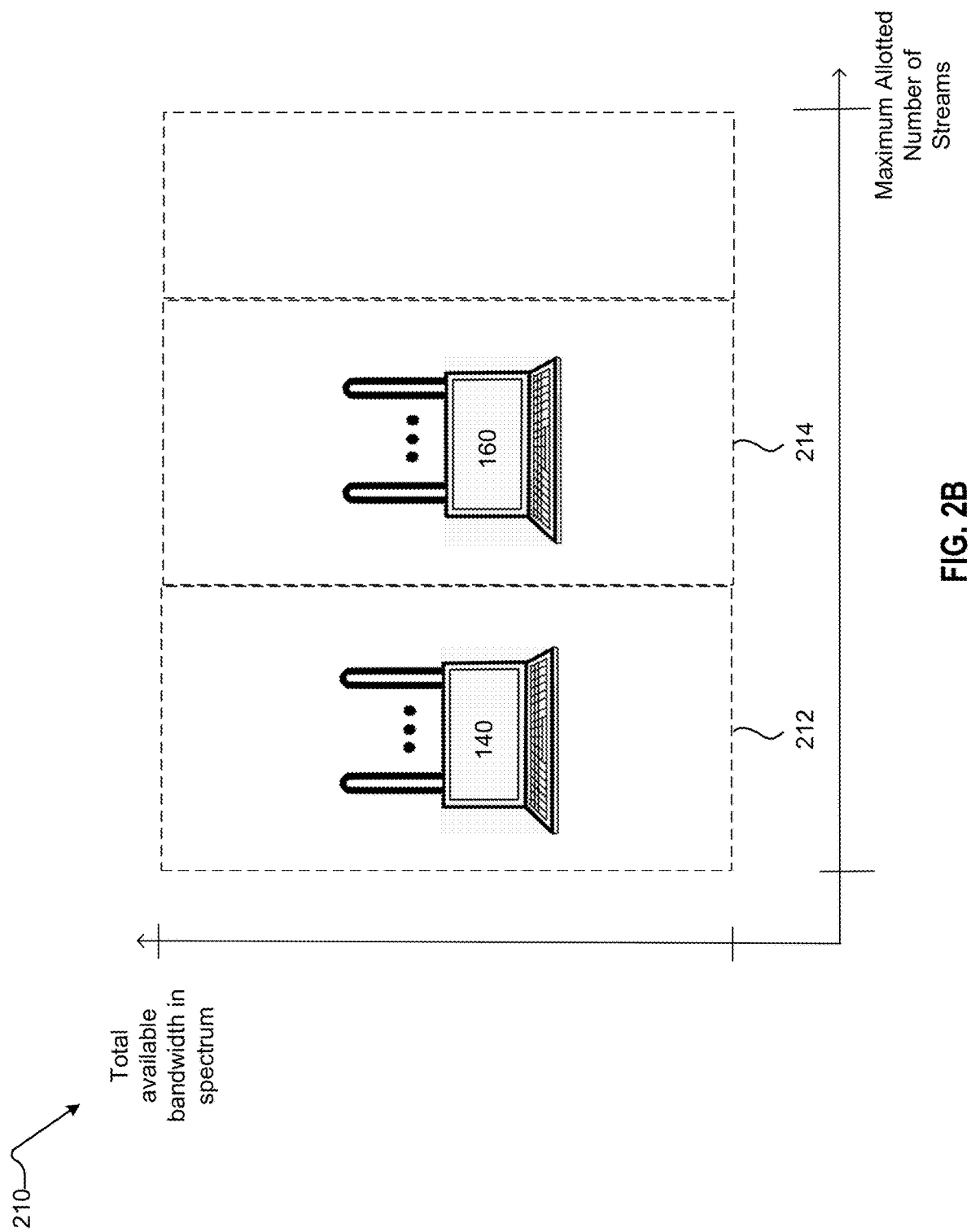
FIG. 2B is an exemplary illustration of full bandwidth MU MIMO, according to embodiments described in the present disclosure.

In a second scenario 210 of full bandwidth MU MIMO, each of the SU MIMO transmissions may occur over distinct, non-overlapping set of spatial streams. As illustrated in FIG. 2B, the client device 140 and the client device 160 may each transmit over an entire portion of a channel (for example, an 80 MHz channel). A maximum allotted number of spatial streams by the access point 120 may be divided up between the client device 140, 160. In particular, the client device 140 may be allocated a first set 212 of spatial streams and the client device 160 may be allocated a second set 214 of spatial streams. As a particular example, if a maximum number of spatial streams allocated by the access point 120 is k, each client device 140, 160 may be allocated, or be permitted to access or utilize, k/2 spatial streams. However, in other embodiments, each client device 140, 160 may be allocated different numbers of spatial streams. In some embodiments, the second scenario 210 may also be extended to Massive MIMO.

Figure 2C:
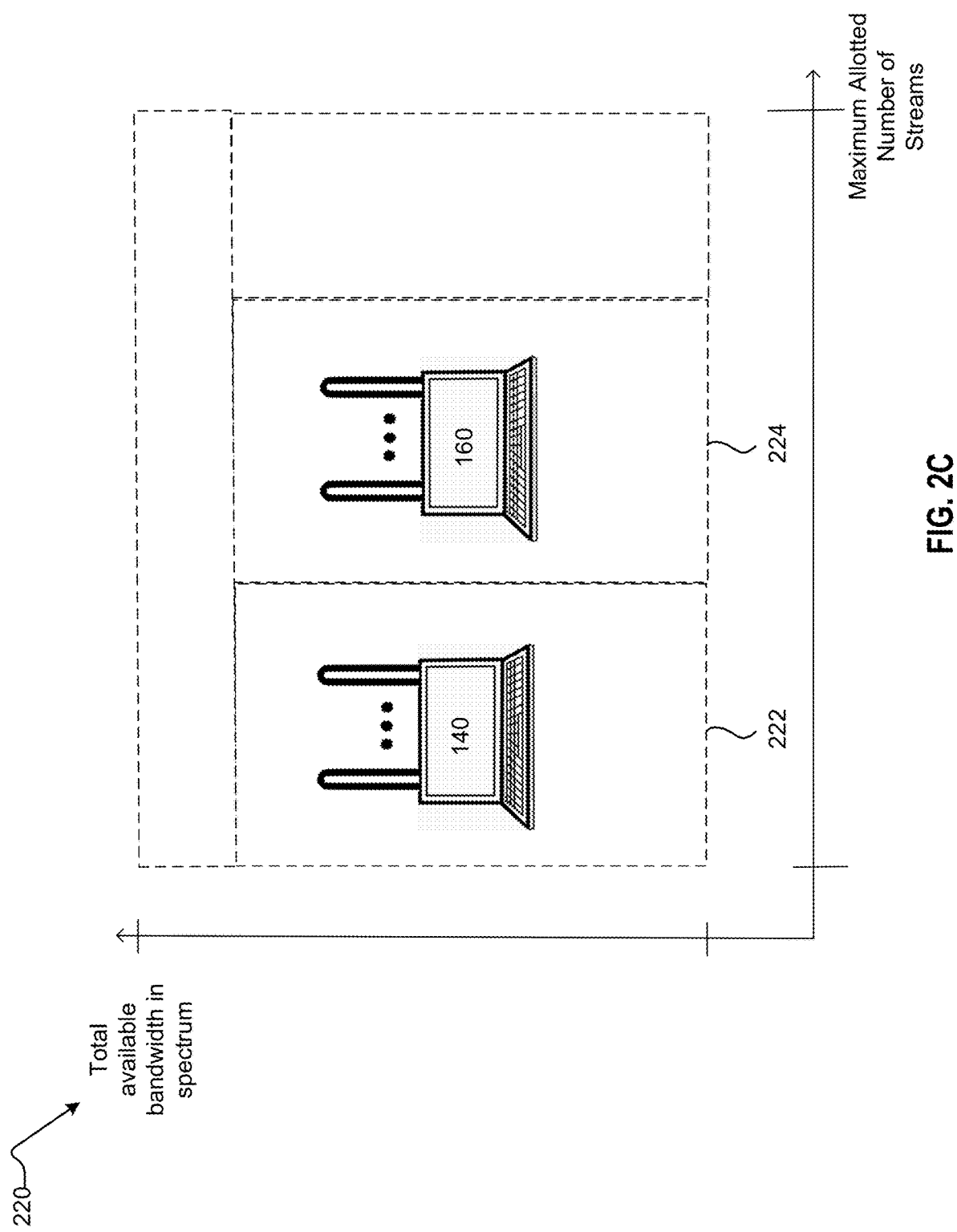
FIG. 2C is an exemplary illustration of partial bandwidth MU MIMO, according to embodiments described in the present disclosure.

In a third scenario 220 of partial bandwidth MIMO, which combines features of MU OFDMA (e.g., resource unit allocation) and MU MIMO (e.g., spatial stream allocation). As illustrated in FIG. 2C, the client device 140 is allocated a first set of spatial streams 222 and the client device 160 is allocated a second set of spatial streams 224. The first set of spatial streams 222 and the second set of spatial streams 224 may be from a same portion of a channel, for example, a common 20 MHz subchannel, which is less than the entire portion of the channel that would have been allotted in the scenario of full bandwidth MU MIMO (for example, an 80 MHz channel). Similar to full bandwidth MU MIMO, a maximum allotted number of spatial streams by the access point 120 may be divided up between the client device 140, 160, so that the client device 140 and the client device 160 may each only transmit over a portion of the total allotted streams by the access point 120.

In some embodiments, the access point 120 may individually and independently determine (e.g., not in conjunction with other access points) which of the three aforementioned protocols or mechanisms to select in conjunction with a beamforming procedure. It is understood that the implementations described below are applicable to both beamforming implementations as shown in FIGS. 1A and 1n FIG. 1C. In some embodiments, the access point 120 may determine, based at least in part on an amount of and/or a type of data requested to be transmitted by each of the client devices (e.g., the client devices 140, 160) a particular protocol to be used. The amount of data may be stored in a buffer of each of the client devices and awaiting transmission. First, the access point 120 may determine a bandwidth to be allocated or allotted to each of the client devices based at least in part on an amount of and/or a type of data requested to be transmitted by each of the client devices. Next, based at least in part on the determined bandwidth, the access point 120 may select a particular protocol to be used for each of the client devices. For example, the access point 120 may select between MU OFDMA or (full/partial bandwidth) MU MIMO based on bandwidths, data content, amount of data and/or type of data content of some or all of spatial streams to be used for transmission by the client devices (e.g., the client devices 140, 160). As a particular example, the access point 120 may select MU OFDMA if bandwidths of the spatial streams transmitted by a subset of, or all, the client devices are less than a threshold bandwidth. Meanwhile, the access point 120 may select MU MIMO if bandwidths of the spatial streams transmitted by a subset of, or all, the client devices satisfy the threshold bandwidth. Upon selecting MU MIMO, the access point 120 may further select between full bandwidth or partial bandwidth MU MIMO depending on whether the bandwidths of the spatial streams transmitted by a subset of, or all, the client devices satisfy a second threshold bandwidth. For instance, if the bandwidths of the spatial streams transmitted by a subset of, or all, the client devices are less than the second threshold bandwidth, the access point 120 may select partial bandwidth MU MIMO to conserve bandwidth resources. Meanwhile, if the bandwidths of the spatial streams transmitted by a subset of, or all, the client devices satisfy the second threshold bandwidth, the access point 120 may select full bandwidth MU MIMO.

In some embodiments, alternatively or additionally, the access point 120 may individually and independently determine which of the three aforementioned protocols to select based on any of the information stored in the database 112. For example, the selection may be based on one or more types of protocols that have historically been used for a particular client device, or groups of client devices, historical data about a type or amount of data previously transmitted from the client devices, and/or data usage patterns of a particular client device or groups of client devices. For example, if a particular client device transmits high-bandwidth data such as multimedia data at a frequency that exceeds a threshold frequency, or at a percentage of times that exceeds a threshold percentage, the access point 120 may determine that the particular client device requires a high bandwidth for data transmission needs, and thus may automatically assign that particular client device to a partial/full bandwidth MU MIMO protocol. Such a situation may be applicable, for example, if the particular client device transmits high bandwidth data once every ten seconds, or at a rate that exceeds a threshold percentage, such as 95%, of all transmissions by the particular client device. Alternatively, if a particular client device historically transmits only voice data without video streaming data at a frequency that exceeds a threshold frequency, that particular client device may be assigned to a MU OFDMA protocol.

In some embodiments, the access point 120 may separate the client devices into groups based on the bandwidths allocated to each of the client devices. For example, a first group may include client devices that were allocated bandwidths between 20 MHz and up to 80 MHz. A second group may include client devices that were allocated bandwidths between 80 MHz and up to 160 MHz. A third group may include client devices that were allocated bandwidths over 160 MHz. The access point 120 may then determine different mechanisms of MU transmission for at least two of the distinct groups. For example, the access point 120 may select MU OFDMA for the first group, and MU MIMO for the second and third groups.

In some embodiments, alternatively or additionally, the access point 120 may incorporate predictions of future transmissions of data by client devices based on a historical frequency and/or intervals between which each of the client devices transmit data in determining how to allocate groups of client devices according to particular transmission protocols. For example, the access point 120 may anticipate or predict that a certain client device will request a particular type or amount of data transmission within a threshold time period. The access point 120 may then anticipate that the certain client device may be allocated to a particular protocol (for example, MU MIMO) with other client devices, while allocating remaining client devices to a different protocol (for example, MU OFDMA) and/or different channels or subchannels. A particular scenario may be, that the access point 120 may predict that a prospective client device will request a transmission of data within a certain range of bandwidths, for example, between 20 MHz and 80 MHz within a threshold time period, for example, one second. This threshold time period may be within a permitted delay time that other client devices in the first group would be permitted to wait before their data transmission requests are fulfilled or completed. This prospective client device may be added to a group, for example, the first group, under certain conditions. Specifically, a total number of current spatial streams scheduled to be transmitted by the client devices within the first group may be less than a total number of antennae at the beamformee by an amount equal to a number of spatial streams scheduled to be transmitted by the prospective client device. For example, the first group may include three client devices that have are each scheduled to transmit two spatial streams. The beamformee may include eight antennae. Thus, if the prospective client device is also scheduled to transmit two spatial streams, then adding the prospective client device to the first group will result in the total number of spatial streams scheduled to be transmitted in the first group being eight, which equals a number of antennae of the beamformee. Therefore, the first group may then be closed or restricted from other client devices being added, because a total number of spatial streams scheduled to be transmitted by client devices cannot exceed the number of antennae of the beamformee. An additional restriction is that a maximum of eight antennae may be sounded in a single transmission, as defined by the 802.11ax standard. Therefore, if the first group already has eight antennae scheduled to be sounded in a single beamforming transmission, the first group may then be closed or restricted from other client devices being added. In such a scenario when the first group is closed or restricted, other client devices would need to be added to other groups.

Figure 2D:
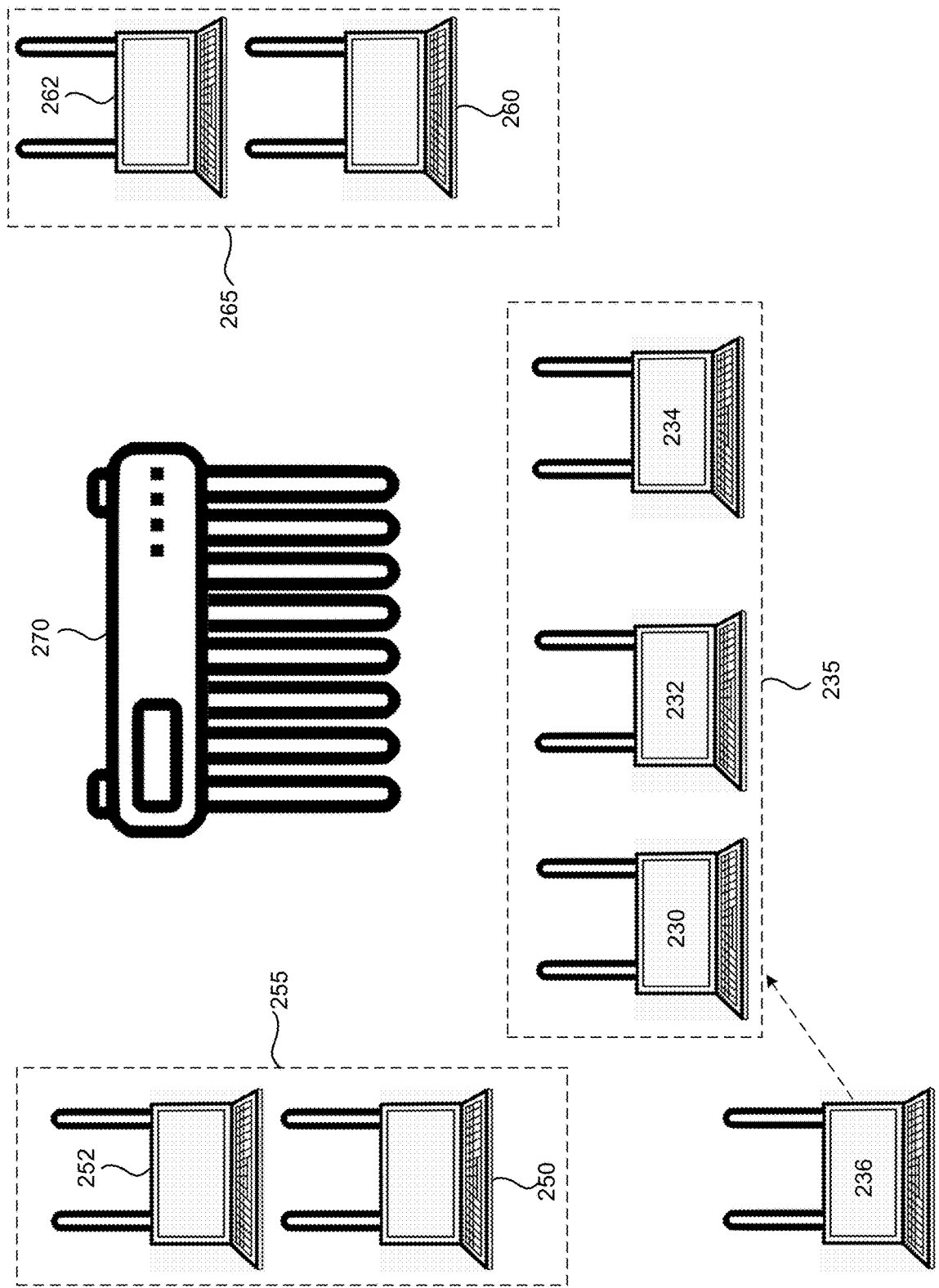
FIG. 2D is an exemplary illustration of a scenario, depicting a formation of groups of client devices, in which a group of client devices is scheduled to be beamformed together, according to embodiments described in the present disclosure.

Such a scenario of assigning a particular mechanism or protocol to client devices is illustrated in FIG. 2D, in which an access point 270 groups client devices based at least in part on their allocated bandwidths. Applicable features of the access point 120 may also apply to the access point 270. The access point 270 may divide the client devices into three groups 235, 255, and 265, as described above. For example, a first group 235 may include client devices 230, 232, and 234 which may each be allocated bandwidths within a first range, such as, between 20 MHz and up to 80 MHz. A second group 255 may include client devices 250 and 252 that were allocated bandwidths between 80 MHz and up to 160 MHz. A third group 265 may include client devices 260 and 262 that were allocated bandwidths over 160 MHz. Thus, the first group 235, the second group 255, and the third group 265 may all require additional client devices in order for beamforming to occur or actually be beneficial. The access point 270 may determine that the first group 235 would require two additional spatial streams in order for beamforming to be beneficial within the first group 235, as the first group 235 currently has a total of six spatial streams among the client devices 230, 232, and 234, while the access point 270 has a total of eight antennae. The first group may predict that a prospective beamformer 236, which has not yet requested data transmission at the access point 270, will be requesting a transmission of data within a certain range of bandwidths, for example, between 20 MHz and 80 MHz within a threshold time period, for example, one second. The prediction may exceed a certain confidence interval. The access point 270 may add the prospective beamformer 236 to the first group 235, and/or close the first group 235 to restrict other client devices from being added to the first group 235. Once a group has a total number of transmitting spatial streams at client devices at most equal to a total number of antennae at the access point 270, the access point 270 may restrict other devices from being added to that group and close the group.

The UL MU transmission, in each of variants illustrated in FIGS. 2A-2C, can be considered as a group of simultaneously occurring single-user (SU) MIMO transmissions that happen to be destined for the same network device (e.g., an access point 120 of FIG. 1) from client devices (e.g., client devices 140, 160 of FIG. 1). The network device, as a beamformee, can be configured to measure channel information and relay the measured channel information back to a client device, which is a beamformer. The client device, as the beamformer, can use the measured channel information to derive transmit beamforming parameters.

Each SU MIMO transmission, within each subcarrier, may be represented by $$Y_i = \sqrt{\frac{\rho_i}{m_i}} H_i W_i X_i + Z_i, \ i \in [1, u],$$

where:

$Y_i$ is a n*1 matrix representing the signal received by the access point from client device i;

u is a number of clients;

$m_i$ is a number of transmit antennae at client device i;

n is a number of receive antennae at the network device;

$X_i$ is a $nss_i$*1 matrix representing the signal transmitted by the client device i, and $nss_i$ is the number of spatial streams transmitted by the client device i, such that $nss_i \le \min(m_i, n)$;

$W_i$ is a $m_i$*$nss_i$ matrix representing antenna weights that the client device i applies on its signal;

$H_i$ is a n*$m_i$ channel matrix representing the effect of the channel on the transmitted signal $X_i$;

$\rho_i$ is an average signal to noise ratio (SNR) for each of $m_i$ antennae;

$Z_i$ is a n*1 matrix representing the noise in the channel.

The $H_i$ channel matrix, within each subcarrier, can be decomposed using Singular Value Decomposition as:

$H_{i_{n*mi}} = U_{i_{n*n}} S_{i_{n*mi}} V_{i_{mi*mi}}^H$, wherein $U_i$ and $V_i$ are unitary matrices, $V_i^H$ is the Hermitian transpose of $V_i$, and $S_i$ is the diagonal matrix containing the singular values for the channel modeled by $H_i$. Thus, the $V_i$ matrix derived from the decomposition, or a sub-matrix of the $V_i$ matrix, following modifications such as a Givens rotation, may be applied as antenna weights $W_i$ for transmission from the client device i. The aforementioned mechanism to determine the antenna weights $W_i$ may be applicable in wireless networks and mesh networks, as illustrated in FIGS. 1A and 1C. In particular, given that nodes, such as access points, in mesh networks, are likely stationary, the antenna weights $W_i$ determined in a mesh network may be applicable or usable for a longer duration than that in downlink (DL) SU transmission beamforming. For example, the antenna weights $W_i$ may be usable for a duration of 200 milliseconds or more, thereby reducing a frequency of sounding and reducing overhead and costs.

In particular, in the UL MU OFDMA scenario 200, the access point 160 may initially determine a number of subcarriers to be allocated to each of the transmitting antennae. The access point 160 may determine, for each subcarrier, a different $V_i$ matrix. Each client device may utilize at least one subcarrier. In other words, for each antenna, weights are determined separately for each subcarrier. Beamforming may be attained by considering the weights corresponding to only the subcarriers that constitute a width of the RU allocated to a particular antenna. Thus, if a subcarrier is not allocated to the particular antenna, then the weights corresponding to those subcarriers are not considered when determining weights corresponding to that particular antenna. In a system including two antennae from a client device and two antennae from an access point, the Vi matrix would be at least 2 by 2. A resulting gain from beamforming may be on an order of four to five decibels (dB).

In the full bandwidth UL MU MIMO scenario 210, the access point 160 may initially determine a number of spatial streams allocated to each client device. The access point 160 may determine a different Vi matrix for each client device, and the $V_i$ matrix may account for one or more other transmitting antennae and receiving antennae. Each of the determined $V_i$ matrices may be 2-by-2 in a system that includes two antennae for each client device and two antennae for the access point 160.

In the partial bandwidth UL MU MIMO scenario 220, which combines features of the aforementioned UL MU OFDMA scenario 200 and the full bandwidth UL MU MIMO scenario 210, a different $V_i$ matrix may be determined for each client device. In partial bandwidth UL MU MIMO, the client devices are multiplexed in both frequency and spatial domains. Each client device computes a separate $V_i$ matrix for each subcarrier, similar to the UL MU OFDMA scenario 200.

Thus, each transmission, modelled as a SU MIMO transmission, can be individually considered by the network device to determine a form of the channel state information (e.g., the V matrix) for a client device that provided the transmission. The client device, once configured with the antennae weights, can improve output SNR across subcarriers of a channel in a bandwidth of transmission. Additionally, the client device can reduce variations in the output SNR across the subcarriers in the channel that occur due to multipath fading. This smoothening effect on the SNR across the bandwidth of transmission can allow for simplifying and improving the choice of modulation and coding scheme (MCS) used for transmission and, thus, can improve range of the transmissions.

However, the inclusion of multiple client devices in the beamforming procedure brings about further challenges of UL sounding of the network device by each of the client devices and coordinating the transmissions among each of the client devices. In some embodiments, these challenges may be addressed by an improved channel sounding procedure, which may be implemented to coordinate the transmissions. As described, conventional approaches may not coordinate channel sounding procedures across multiple client devices, which can result in undesirable resources and airtime overheads.

The improved channel sounding procedure can build upon the channel sounding procedure of existing 802.11 standards, such as that established in the 802.11ac standard. The improved channel sounding procedure can coordinate (e.g., synchronize) the channel sounding procedure to occur at the same time for multiple stations (e.g., client devices 140, 160 of FIG. 1). The improved channel sounding procedure can be applied to various UL MU scenarios (e.g., the scenarios 200, 210, 220 of FIGS. 2A-2C). The improved channel sounding procedure can further provide how to communicate the feedback for transmit beamforming to a receiving device (e.g., the access point 120 of FIG. 1) for proper reception of beamformed data transmissions from the stations. More details are provided with regard to FIGS. 3A-3B.

Figure 3A:
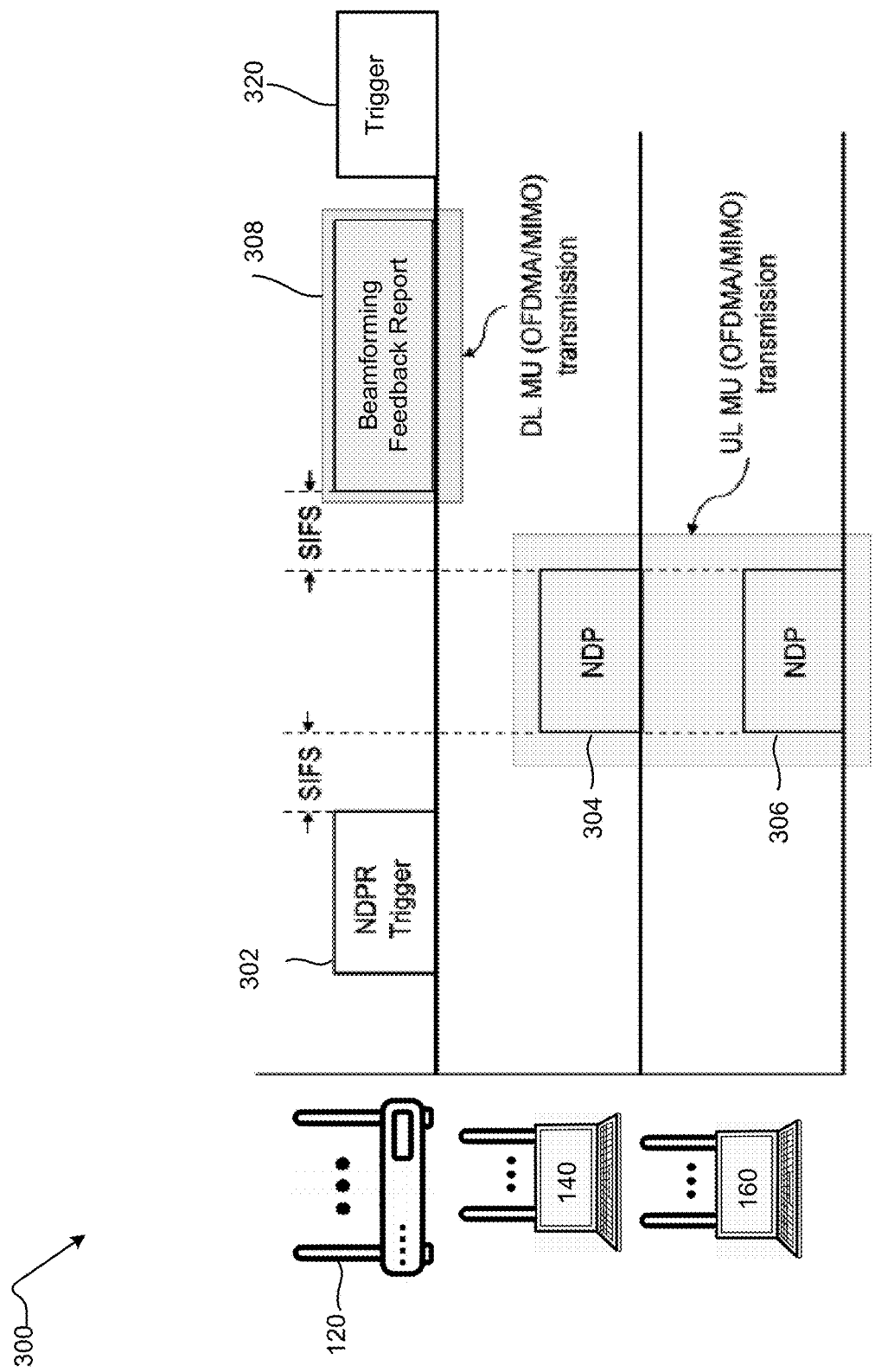
FIGS. 3A-3B are exemplary illustrations of channel sounding procedures, according to embodiments described in the present disclosure. In particular.
Figure 3B:
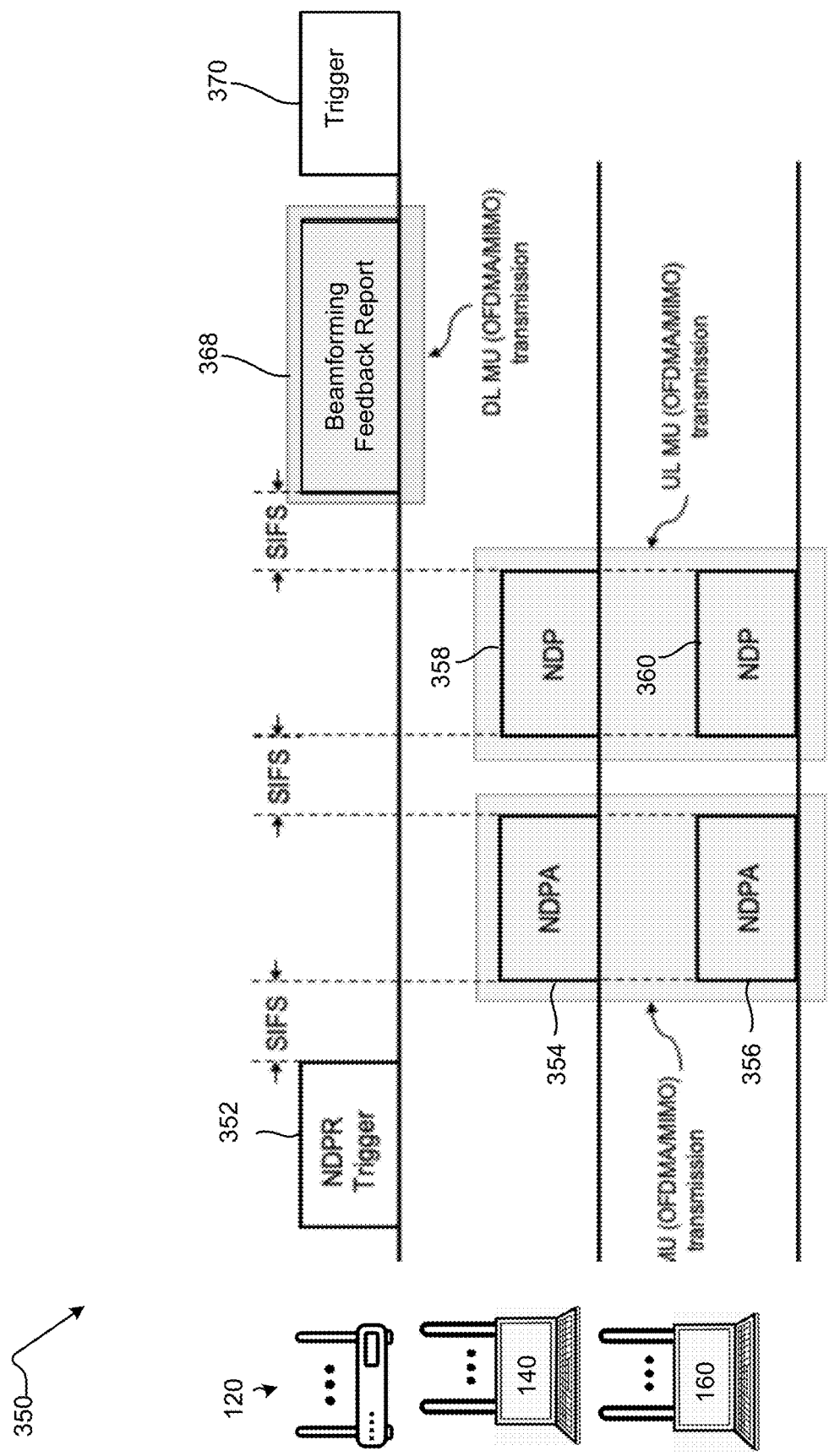

FIGS. 3A-3B illustrate channel sounding procedures, according to embodiments described in the present disclosure. The description may apply to an environment as illustrated in FIG. 1A or FIG. 1C. FIG. 3A illustrates a first scenario 300 of a multi-user sounding operation on uplink. In the first scenario 300, a beamformee network device (e.g., the access point 120 of FIG. 1) may transmit a Null Data Packet Request (NDPR) frame (e.g., a trigger frame for sounding, hereinafter "trigger frame") 302 to each beamformer, or client device (e.g., the client devices 140, 160 of FIG. 1). The access point 120 may, in some examples, coordinate or synchronize the transmission of the NDPR frames such that the NDPR frames are predicted to be received at each of the beamformer client devices at a same time, or within a threshold time range of one another. Such prediction may be based, for example, on distances from the access point 120 to each of the respective client devices 140, 160. The trigger frame can be transmitted by the network device to multiple client devices at the same, or essentially the same time. The trigger frame can mark the start of the channel sounding procedures for those client devices. The foregoing description focuses on a scenario in which one access point serves as a beamformee.

In the first scenario 300, the NDPR frame 302 is the new function that permits the beamformee to initiate sounding. Traditionally, the NDPA frame is transmitted by the beamformer and serves the purpose of accessing a channel for commencing the channel sounding procedure. The NDPA frame can include certain parameters set by the beamformer for a particular instance of sounding. Some of these parameters can relate to station information records such as a beamformee identifier (e.g., a station identifier in traditional DL beamforming, and in uplink beamforming, this field is set to zero) and a number of columns in a feedback matrix (e.g., Nc Index). As illustrated, the first scenario 300 provides a channel sounding procedure that does away with the traditional NDPA frame. Instead of the NDPA frame, the NDPR frame 302 can contain some or all of the parameters traditionally contained in the NDPA frame, including specific fields for performing a channel sounding procedure for each client device. In some embodiments, the NDPR frame can include a list of client devices that should sound.

Each of the client devices may, in response to receipt of the NDPR frame 302, send a corresponding response frame. The corresponding response frame can be null data packet (NDP) frame 304, 306, which may have the same or similar structure as NDP defined in the existing 802.11 standard. The NDP frame 304, 306 can be transmitted over a range of subcarriers that need to be sounded for beamforming. The NDP frame 304, 306 can provide, to the network device, training fields the network device can use to determine/calculate feedback report (e.g., feedback matrix). In some embodiments, each client device may respond with the corresponding response frames after a previously agreed upon (e.g., specified in the channel sounding procedure) time duration, such as a short inter frame sequence (SIFS).

A NDP frame 304, 306 can contain as many long-training fields (LTF) as a number of antennae for which a client device is sounding. When the client device uses a certain number of antennae to transmit the NDP frame 304, 306 to a network device, the same number of LTF can be contained in the NDP frame 304, 306. Thus, there is no other limitation on the number of spatial streams that are used for the transmission of the NDP frame 304, 306, as long as they are not more than the number of antennae.

Multiple client devices can be grouped such that the client devices in the same group can transmit the NDP frames 304, 306 on the entire bandwidth (i.e., on all of the subcarriers) of a channel using UL MU MIMO while sharing spatial streams for their transmissions. Thus, a network device can request the client devices in the same group to perform full bandwidth sounding.

Alternatively or additionally, multiple client devices can be grouped such that the client devices in the same group can transmit the NDP frames 304, 306 on a subset of the entire bandwidth (i.e., on a subset of subcarriers) of a channel using UL MU OFDMA. Thus, a network device can request the client devices in the same group to perform partial bandwidth sounding. Each client device can transmit its NDP frame 304, 306 using a separate RU that includes only the subset of subcarriers.

In response to receipt of the NDP frames 304, 306, the network device can determine (e.g., calculate) a beamforming feedback report (e.g., feedback matrix) 308 and transmit at least a portion of the beamforming feedback report 308 to each of the client devices.

Each client device can determine (e.g., calculate) its own steering matrix based on the portion of the feedback report 308. In some embodiments, the beamforming feedback report 308 or a portion thereof can be provided to the client devices within SIFS duration of receiving the NDP frames 304, 306 from the client devices. As illustrated, the beamforming feedback report 308 can be transmitted by the network device to the client devices as a payload of a frame using either MU OFDMA or MU MIMO. A client device can direct transmissions toward the network device based on a steering matrix of the client device.

The first scenario 300 illustrates changes over the existing beamforming processes. As one difference, the first scenario 300 illustrates UL MU beamforming. As another difference, instead of a channel sounding procedure being initiated by each client device 140 (e.g., the client device 140 of FIG. 1) sequentially in time and without any correlation to the sounding procedure at other client device (e.g., the client device 160 of FIG. 1), a network device (e.g., the access point 120 of FIG. 1) can now trigger the channel sounding procedure for multiple client devices at the same time. The coordinated triggering and handling of response frames can reduce resource consumption, airtime occupation, and, thus, optimize the overall use of a channel for sounding. As yet another difference, parameters for sounding may now be dictated in a NDPR frame 302 by a network device as opposed to being announced by client devices in the traditional NDPA frames.

FIG. 3B illustrates a second scenario 350 of a multi-user sounding operation on uplink that can include an NDPA frame described above. In the second scenario 350, beamformer client devices (e.g., the client devices 140, 160 of FIG. 1) can respond to a NDPR frame 352 (e.g., a trigger frame) transmitted by a beamformee network device (e.g., the access point 120 of FIG. 1) to the client devices additionally with NDPA frames 354, 356 that are transmitted by the client devices. Similar with the first scenario 300, the trigger frame can be transmitted by the network device to multiple client devices at the same, or substantially the same, time. The trigger frame can mark the start of channel sounding procedures for those client devices.

In the second scenario 350, client devices can dictate sounding parameters instead of a network device. The second scenario 350, compared to the first scenario 300, additionally involves UL MU transmissions of NDPA frames 354, 356 from the client devices before the UL MU transmissions of NDP frames 358, 360. The NDPA frames 354, 356 and the NDP frames 358, 360 can be transmitted as responses to the NDPR frame 352.

In some embodiments, the network device may provide certain sounding parameters for each client devices in the NDPR frame 352. The NDPA frames 354, 356 can allow the client devices to override such sounding parameters provided by the network device for each client device. For instance, a client device may override the sounding parameters based on any limitations that the client device has.

In some other embodiments, the network device may not provide the sounding parameters for the client devices in the NDPR frame 352. With the NDPA frames 354, 356, the client devices may advertise their own sounding parameters in the NDPA frames 354, 356.

Thus, in the second scenario 350, the NDPR frame 352 accesses a channel for the channel sounding procedure while sounding parameters are handled by the NDPA frame 354, 356 solely or in conjunction with the NDPR frame 352. For example, a number of LTFs in the NDP frame 358, 360 can be determined not by the NDPR frame 352 but by the value of the Nc Index subfield in the NDPA frame 354, 356. Here, the NDPA frame 354, 356 can carry the sounding parameters. Thus, the NDPA frame 354, 356 can be transmitted using UL MU OFDMA or UL MU MIMO irrespective of what UL MU scenario (e.g., scenarios 200, 210, 220 of FIGS. 2A-2C) is used for the NDP frame 358, 360 that follows.

In response to receipt of the NDP frames 358, 360, the network device can determine (e.g., calculate) a beamforming feedback report (e.g., feedback matrix) 368 and transmit at least a portion of the beamforming feedback report 368 to each of the client devices.

Each client device can determine (e.g., calculate) its own steering matrix based on the portion of the feedback report 368. In some embodiments, the beamforming feedback report 368 or a portion thereof can be provided to the client devices within SIFS duration of receiving the NDP frames 358, 360 from the client devices. As illustrated, the beamforming feedback report 368 can be transmitted by the network device to the client devices as a payload of a frame using either MU OFDMA or MU MIMO. A client device can direct transmissions toward the network device based on a steering matrix of the client device.

The channel sounding procedures illustrated in FIGS. 3A-3B can repeated to update steering matrices of the client devices. For instance, the channel sounding procedures can be periodically performed every 500 milliseconds. In some embodiments, groups of client devices can be determined based on their respective channel properties and the channel sounding procedure can be periodically performed for each separate group of client devices. For instance, a first group can contain MU MIMO client devices and a second group can contain MU OFDMA client devices, and a channel sounding procedure can separately be performed for each group. A network device can trigger the channel sounding procedures for any combination (e.g., groups) of clients together. Also, the ensuing UL MU data transmission can be performed by grouping clients independently of their grouping for sounding.

In some embodiments, a network device can trigger the channel sounding procedures based on validity of beamforming feedback provided to client devices. The validity of the beamforming feedback for a given client device can be assessed independently of any other client device(s) and irrespective of whether any two client devices were sounded together or not. For instance, if the network device determines that a particular client device is exhibiting SNR below a threshold level, the network device can trigger the channel sounding procedure for the client device or a group containing the client device. Similarly, each client device can independently assess validity of its steering matrix based on its SNR. When a client device assesses that its steering matrix is no longer valid, it may individually initiate a conventional SU transmit beamforming channel sounding procedure.

The channel sounding procedures have various important distinctions over conventional channel sounding procedure of existing 802.11 standards. A distinction is an addition of a null data packet request (NDPR) function that can initiate the channel sounding procedures for multiple client devices. Yet another distinction is that a network device can transmit the NDPR frame to the client devices. Yet another distinction is that frames transmitted (e.g., NDP frames and/or NDPA frames) by the client devices in response to the NDPR frame can be received in a coordinated (e.g., synchronized) manner by the beamformee network device, which saves time that would otherwise be consumed by having to receive response frames one-by-one from each individual client device. Yet another distinction is that the client devices can be grouped into one or more subsets of the client devices based on their channel properties. These distinctions are exemplary and not to be considered as limiting.

The channel sounding procedures can provide various advantages over the conventional channel sounding procedure. First, airtime used for sounding across all client devices can be reduced (e.g., optimized with lower airtime). The greater the group-size of client devices involved in coordinated sounding, the lower the airtime. Second, periodicity of the channel sounding procedure for a group of client devices can be independent among groups. Third, while the client devices can be made to participate in the coordinated sounding together, sounding feedback results for each client device can still be independent of sounding feedback for the other client devices. These advantages are exemplary and not to be considered as limiting.

Once a channel sounding procedure completes, client devices can beamform their UL MU data transmissions to a network device. In some embodiments, the network device may control whether a client device should beamform its UL data transmission. For instance, when the network device is triggering the client device for UL data transmission, a triggering frame for the UL data transmission can include an indicator (e.g., a bit or a sequence of bits) to instruct whether or not the client device should beamform the UL data transmission using the most recent feedback report form the network device. In some embodiments, the client device may indicate whether or not it has beamformed UL data transmission by including an indicator (e.g., a bit or a sequence of bits) in a header of the UL data transmission. The above described embodiments can be applied to all scenarios 200, 210, 220 described in FIGS. 2A-2C.

Figure 4:
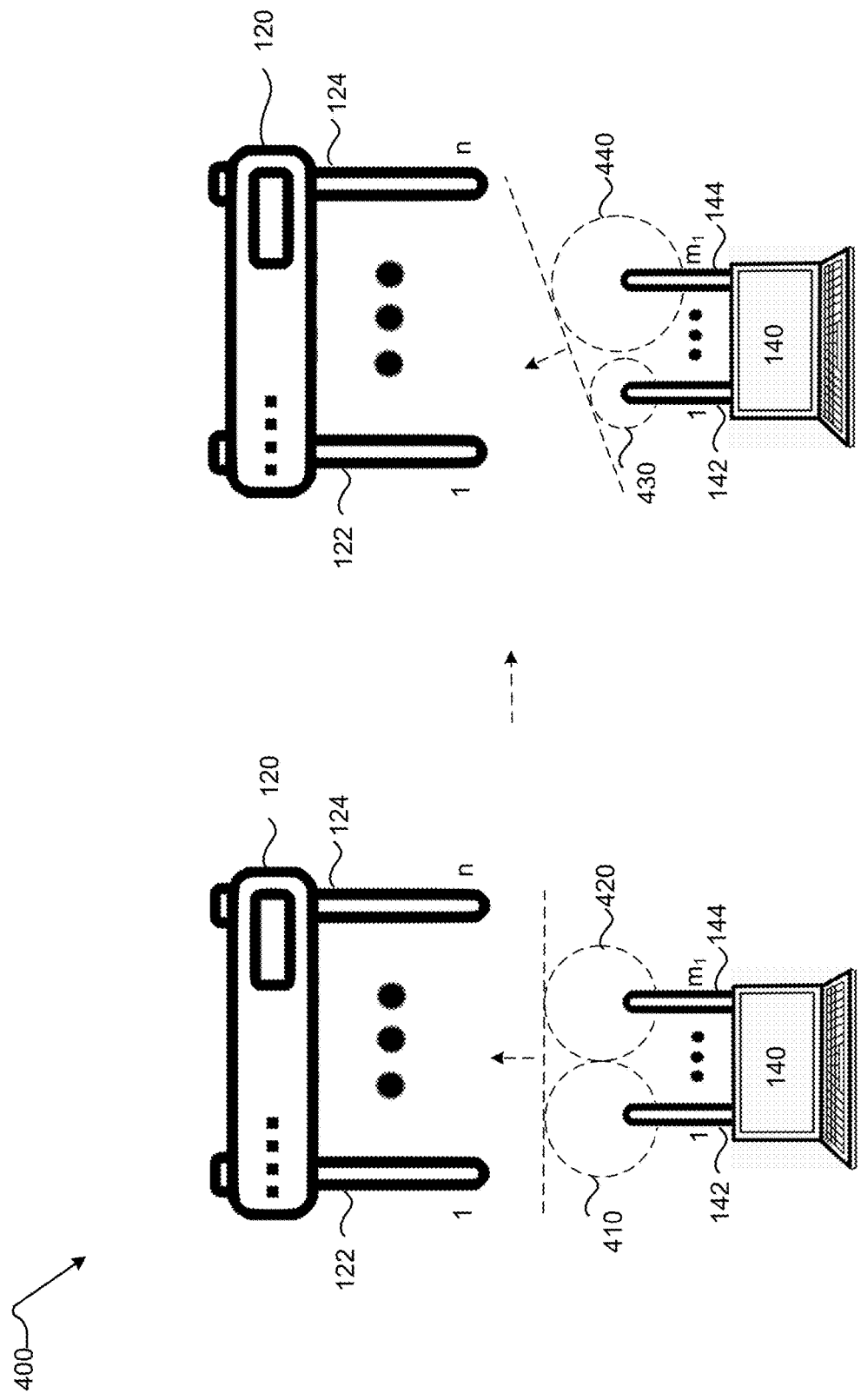
FIG. 4 is an exemplary illustration that depicts an exemplary outcome of a transmit beamforming procedure, according to embodiments described in the present disclosure.

FIG. 4 is an illustration that depicts an exemplary outcome 400 of a transmit beamforming procedure, according to embodiments described in the present disclosure. In FIG. 4, signals 410, 420 may represent states of transmission prior to a beamforming procedure. Meanwhile, signals 430, 440 may represent states of transmission following the beamforming procedure. The signals 430, 440 may be adjusted in phase and/or angle, as a result of the operations described in reference to the any of previous FIG. 1A, 1C, 3A, or 3B. Some signals in particular directions may constructively interfere and thus become stronger, while other signals in non-preferred directions may destructively interfere and become weaker. Therefore, signals may be transmitted to be directed preferentially in one or more particular directions as a result of beamforming.

Figure 5:
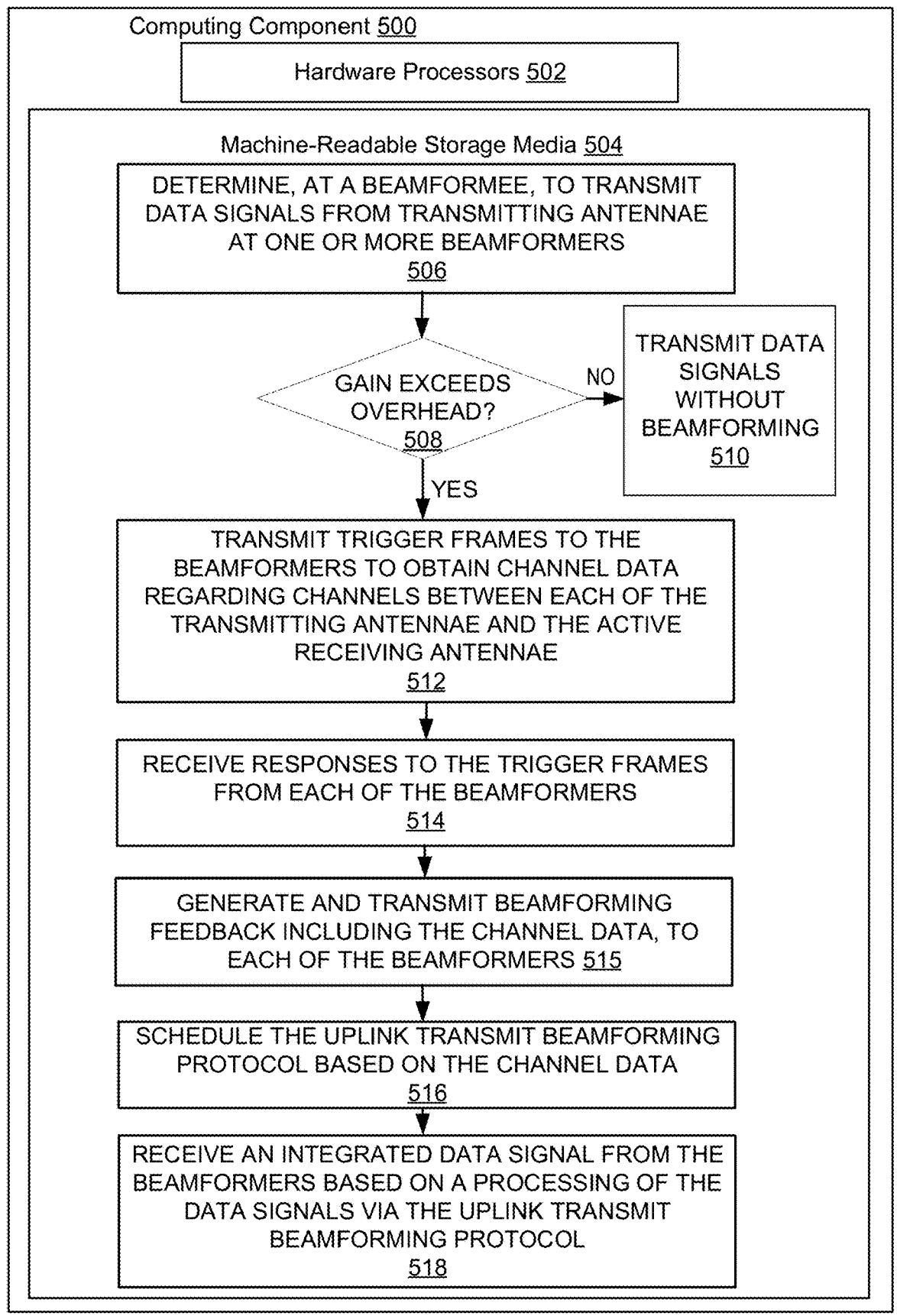
FIG. 5 is an exemplary flowchart, illustrating an overall process of uplink transmit beamforming, according to embodiments described in the present disclosure.

FIG. 5 is an exemplary flowchart, illustrating an overall process of uplink transmit beamforming, according to embodiments described in the present disclosure. In some embodiments, the computing component 500 may comprise one or more hardware processor(s) 502 and machine-readable storage media 504 storing a set of machine-readable/machine-executable instructions that, when executed, cause the hardware processor(s) 502 to steer client devices to mapped access point radios. It should be appreciated that there can be additional, fewer, or alternative steps performed in similar or alternative orders, or in parallel, within the scope of the various embodiments discussed herein unless otherwise stated. The hardware processor(s) 502 may be implemented, for example, as, or as part of, the computing system 111 of FIG. 1A or 1C. The machine-readable storage media 504 may include suitable machine-readable storage media described in FIG. 8.

In step 506, the hardware processor(s) 502 may execute machine-readable/machine-executable instructions stored in the machine-readable storage media 504 to determine, at a beamformee such as an access point (e.g., the access point 120), to transmit data signals from transmitting antennae at one or more client devices, prospective beamformers, or beamformers (hereinafter "client devices" or "beamformers"), which may be stations (e.g., the client devices 140, 160). For example, the determination may be based on a type of data and/or an amount of data stored in a buffer of one or both of the client devices 140, 160, which are awaiting transmission. The hardware processor(s) 502 may store or log the requests and associated data into a queue and/or into the database 112, and transmit the data signals within a threshold period of time of receiving the request.

In decision 508, the hardware processor(s) 502 may determine or predict whether a gain resulting from an uplink transmit beamforming protocol exceeds an overhead of the transmit beamforming protocol. For example, the determination may be based at least in part on a number of transmitting spatial streams and a number of active receiving antennae at the beamformee and the frequency of executing the protocol. In some embodiments, if a total number of transmitting spatial streams across all client devices is equal to a total number of active receiving antennae at the beamformee, the hardware processor(s) 502 may determine or predict that the gain would exceed the overhead. In some embodiments, if a total number of transmitting spatial streams across all client devices is within a threshold range or percentage (for example, 10% or 25%) compared to a total number of active receiving antennae at the beamformee, the hardware processor(s) 502 may determine that the gain would exceed the overhead. For example, in the above scenario, if the total number of transmitting spatial streams across all client devices is three and the total number of antennae at the beamformee is four, the difference between the total number of transmitting spatial streams and the total number of antennae at the beamformee is 25 percent. The hardware processor(s) 502 may determine that 25% is within the threshold percentage, and determine or predict that the gain would exceed the overhead. In some embodiments, the overhead may include a determined or predicted time consumed during a sounding procedure preceding the transmit beamforming protocol, a determined or predicted bandwidth, and/or computing resources consumed during the sounding procedure, and/or a determined or predicted amount of computing resources consumed during the beamforming protocol. In some examples, the hardware processor(s) 502 may determine whether certain data signals may be successfully beamformed together with other data signals of other client devices within the threshold period of time. In some embodiments, such a determination that the certain data signals may be successfully beamformed together with the other data signals may be based on whether a predicted or determined gain from the beamforming of the certain data signals and the other data signals exceeds an overhead. In some examples, alternatively or additionally, the hardware processor(s) 502 may determine a number of scheduled spatial streams to be allocated to transmission of the certain data signals, a number of second scheduled spatial streams to be allocated to the transmission of the other data signals, and whether a total combined number of scheduled spatial streams and the second scheduled spatial streams is less than or equal to a total number of antennae at the beamformee. If so, the hardware processor(s) 502 may determine that the data signals and the second data signals may be beamformed together.

In step 510, the hardware processor(s) 502 may have made a negative determination or prediction in decision 508, that a gain from an uplink transmit beamforming protocol would not exceed the overhead. For example, the hardware processor(s) 502 may have determined that the data signals cannot be successfully beamformed together with other data signals from other client devices within the threshold period of time. One cause may be that not enough other client devices have other data signals that are awaiting transmission. For example, if the beamformee has eight antennae, while the client devices collectively have two spatial streams awaiting transmission, and only one other device is requesting transmission of the other data signals across two spatial streams, the number of client device spatial streams may be insufficient for beamforming. In other examples, the hardware processor(s) 502 may have determined or predicted that the data signals cannot be successfully beamformed together with other data signals from other antenna because other client devices have been selected for a beamforming procedure due to amounts and/or types of data requested to be transmitted at the other client devices. Upon the negative determination or prediction, the hardware processor(s) 502 may determine to transmit the data signals without beamforming.

Meanwhile, in step 512, the hardware processor(s) 502 may have made a positive determination or prediction in decision 508, that a gain from an uplink transmit beamforming protocol would match or exceed the overhead. Upon such positive determination or prediction, the hardware processor(s) 502 may conduct or implement uplink transmit beamforming (steps 512-518). In step 512, as illustrated in FIGS. 3A-3B, the hardware processor(s) 502 may initiate a sounding procedure by transmitting trigger frames to the client devices to obtain channel data regarding channels and/or subchannels between each of the transmitting antennae and the active receiving antennae. In some embodiments, a frequency or periodicity of the sounding procedure (e.g., the transmission of trigger frames) to each client device may be independent of such frequency or periodicity of other client devices. A frequency at which the trigger frames are transmitted to the client devices may be decreased in a scenario of a mesh network to account for a relatively static nature of the mesh network. The trigger frames may include any or all of a list or group of client devices involved in a UL MU transmission, RU and spatial stream allocation, modulation and coding scheme, and transmit powers to be used during data transmission. In some embodiments, if an amount of data transmitted is greater than a threshold amount, the trigger may also contain information about a width of primary channels of an expected clear to send (CTS) frame. In some embodiments, the transmission of the trigger frames may utilize any of the partial or full bandwidth MU MIMO, or the MU OFDMA protocol. The transmission of the trigger frames may be through a same channel(s) or subchannel(s) that the data signals from the client devices will be transmitted across. In some embodiments, the transmission of the trigger frames may be synchronized across all the client devices such that the client devices may receive the trigger frames at a same time, frequency, and/or amplitude. Thus, the hardware processor(s) 502 may predict a duration of time to transmit the trigger frames to each of the client devices based at least in part on respective distances from the beamformee to each of the client devices. The hardware processor(s) 502 may synchronize the transmission of the trigger frames such that predicted times of receipt of the trigger frames at each of the client devices are within time windows, for example, within 100 nanoseconds of one another. Such a mechanism increases a likelihood that each of the client devices may respond to the trigger frames at same or similar time windows.

In step 514, as illustrated in FIGS. 3A-3B, the hardware processor(s) 502 may receive responses to the trigger frames from each of the client devices. The responses to the trigger frames may include, for example, the NDPs 304, 306, or the NDPAs 354, 356, followed by the NDPs 358, 360 as described in reference to FIGS. 3A-3B. In step 515, the hardware processor(s) 502 may generate and transmit (e.g., feed back to the client devices) beamforming feedback including the channel data, to the client devices 140, 160. For example, such a transmit beamforming feedback may be manifested as the beamforming feedback report 308 of FIG. 3A or the beamforming feedback report 368 of FIG. 3B. In step 516, as illustrated in FIGS. 3A-3B, the hardware processor(s) 502 may transmit a trigger to each of the client devices, separate from the beamforming feedback of step 515, and schedule the uplink transmit beamforming protocol based on the channel data and/or the beamforming feedback report. The trigger may be manifested as the trigger 320 of FIG. 3A or the trigger 370 of FIG. 3B and initiates the transmission of the UL MU data itself, rather than the sounding protocol as described with respect to the trigger frames in step 512. The trigger 320 of FIG. 3A or the trigger 370 of FIG. 3B may also be referred to as a second trigger frame. The second trigger frame may contain one or more bits, such as a sequence of bits or a single bit, that indicate whether or not each of the client devices should beamform the UL MU data using a most recent beamforming feedback from the beamformee. For example, the second trigger frame may contain one or more bits indicating that the beamformers should beamform the UL MU data using a most recent beamforming feedback from the beamformee. These one or more bits may be included in the scenarios of full- or partial-bandwidth UL MU MIMO as well as UL MU OFDMA. This indication may or may not be binding on each of the client devices. For example, in some examples, each of the client devices may be permitted to determine themselves whether or not to beamform, even if such determination is counter to the indication provided by the beamformee. By incorporating the one or more bits, the beamformee retains at least some control of the beamforming, in particular, which of the client devices should beamform.

Alternatively or additionally, when a client device is triggered for UL MU data transmission (again, distinct from being triggered for the sounding protocol), a data frame as part of the UL MU data transmission from the client device may contain one or more bits, such as a sequence of bits, indicating whether or not the client device has beamformed the UL MU data transmission. These one or more bits may be included in the scenarios of full- or partial-bandwidth UL MU MIMO as well as UL MU OFDMA. Using such a mechanism, each client device may retain control of whether or not to beamform an UL MU data transmission.

Further in step 516, the scheduling may be based on bandwidths to be allocated and/or particular subchannels allocated to one or more of the beamformers. The scheduling may further include determining a timing, frequency, and/or power of a data signal to be transmitted from each of the client devices. The scheduling will be described in more detail in FIG. 6. In step 518, the hardware processor(s) 502 may receive an integrated data signal from the client devices based on a processing of the data signals via the uplink transmit beamforming protocol using UL MU.

Figure 6:
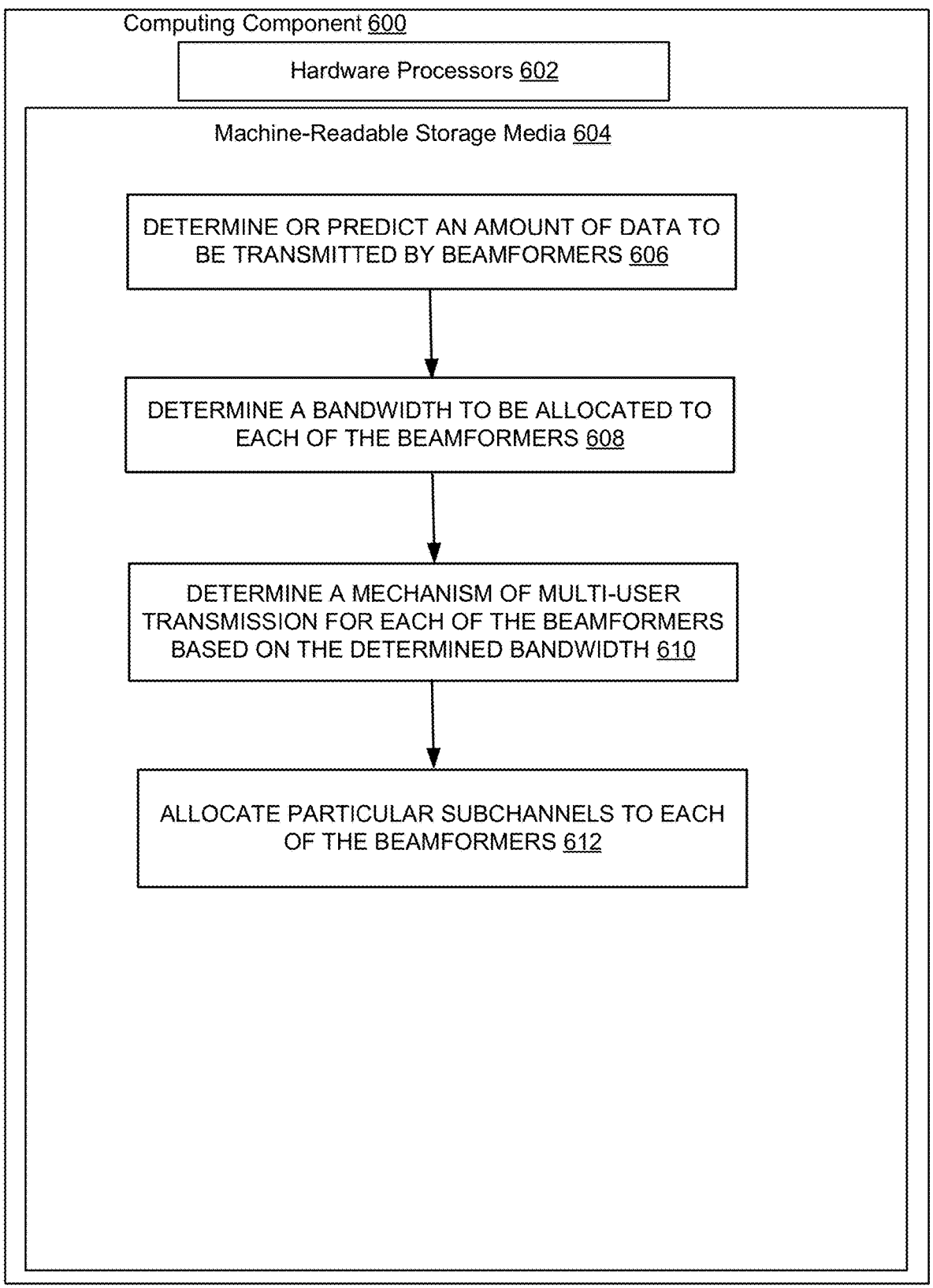
FIG. 6 is an exemplary flowchart, illustrating a process of scheduling an uplink transmit beamforming protocols, according to embodiments described in the present disclosure.

FIG. 6 is an exemplary flowchart, illustrating a process of scheduling an uplink transmit beamforming protocols, according to embodiments described in the present disclosure. FIG. 6 describes an extension of the step 516 of FIG. 5. Alternatively, the steps illustrated in FIG. 6 may be performed as part of steps 506 or 510, or decision 508. In some embodiments, the computing component 600 may comprise one or more hardware processor(s) 602 and machine-readable storage media 604 storing a set of machine-readable/machine-executable instructions that, when executed, cause the hardware processor(s) 602 to steer client devices to mapped access point radios. It should be appreciated that there can be additional, fewer, or alternative steps performed in similar or alternative orders, or in parallel, within the scope of the various embodiments discussed herein unless otherwise stated. The hardware processor(s) 602 may be implemented, for example, as, or as part of, the computing system 111 of FIGS. 1A-1C. The machine-readable storage media 604 may include suitable machine-readable storage media described in FIG. 8.

In step 606, the hardware processor(s) 602 may determine or predict an amount of data to be transmitted by each of the client devices that have requested transmission of data signals. For example, the hardware processor(s) 602 may determine an amount of data in data buffers associated with each of the client devices awaiting transmission of the data signals. Each of the client devices may transmit buffer status reports (BSRs) either in response to a BSR Poll (BSRP) trigger frame sent by the AP or via an unsolicited BSR scheme, in which the BSRs are incorporated in a QoS control field and/or a BSR control field of frames sent to the access point. In some embodiments, the BSRPs may be incorporated as part of the sounding mechanism, for example, as part of the NDP frame 302 or 352. The data in the data buffers may be awaiting transmission. Additionally or alternatively, the hardware processor(s) 602 may determine types of data signals (e.g., multimedia, text, images, audio, video) to be transmitted by each of the client devices. In some embodiments, the hardware processor(s) 602 may, additionally or alternatively, predict an amount and/or type of data to be requested for transmission by one or more of the client devices, for example, based on historical frequencies or intervals at which one or more of the client devices request data transmission.

In step 608, the hardware processor(s) 602 may determine a bandwidth to be allocated to each of the client devices, based at least in part on any or all of the determinations or predictions in the step 606. For example, the hardware processor(s) 602 may determine a required bandwidth to be allocated to each of the client devices depending on an amount of data in the data buffers corresponding to each of the client devices. As a particular example, if a particular client device has a certain amount of data in its buffer awaiting transmission, that particular client devices may be allocated a 20 MHz bandwidth. If an other client device has a higher amount of data in its buffer awaiting transmission, that other client device may be allocated a 40 MHz bandwidth.

In step 610, the hardware processor(s) 602 may determine a mechanism of MU transmission (e.g., MU OFDMA, partial or full bandwidth MU MIMO) for each of the client devices based on the determined bandwidth to be allocated to each of the client devices. In some examples, the hardware processor(s) 602 may select MU OFDMA as a protocol for a group of client devices that are allocated a bandwidth that is less than a threshold bandwidth. Thus, all client devices that are allocated less than the threshold bandwidth may be grouped together to beamform according to the MU OFDMA protocol. In some examples, remaining client devices that are allocated at least the threshold bandwidth may be grouped together to beamform according to the MU MIMO protocol. Out of the remaining client devices, any client devices allocated less than a second threshold bandwidth (e.g., at least the threshold bandwidth, but less than the second threshold bandwidth) may be grouped together to beamform according to the partial bandwidth MU MIMO protocol, while other client devices allocated at least the second threshold bandwidth may be grouped together to beamform according to the full bandwidth MU MIMO protocol.

In some embodiments, the hardware processor(s) 602 may determine further beamforming parameters, settings, or requirements, such as, in step 612, particular subchannels to be assigned or allocated to each of the client devices. Such determination may be based on available bandwidth remaining in the channels and/or subchannels, and/or a historical allocation or assignment of the subchannels to each of the client devices. The hardware processor(s) 602 may also determine a number of spatial streams to be allocated to each of the client devices. The hardware processor(s) may further determine a number of subcarriers to be allocated to each of the client devices and/or to each of the transmitting antennae in a scenario of a UL MU OFDMA protocol.

Figure 7:
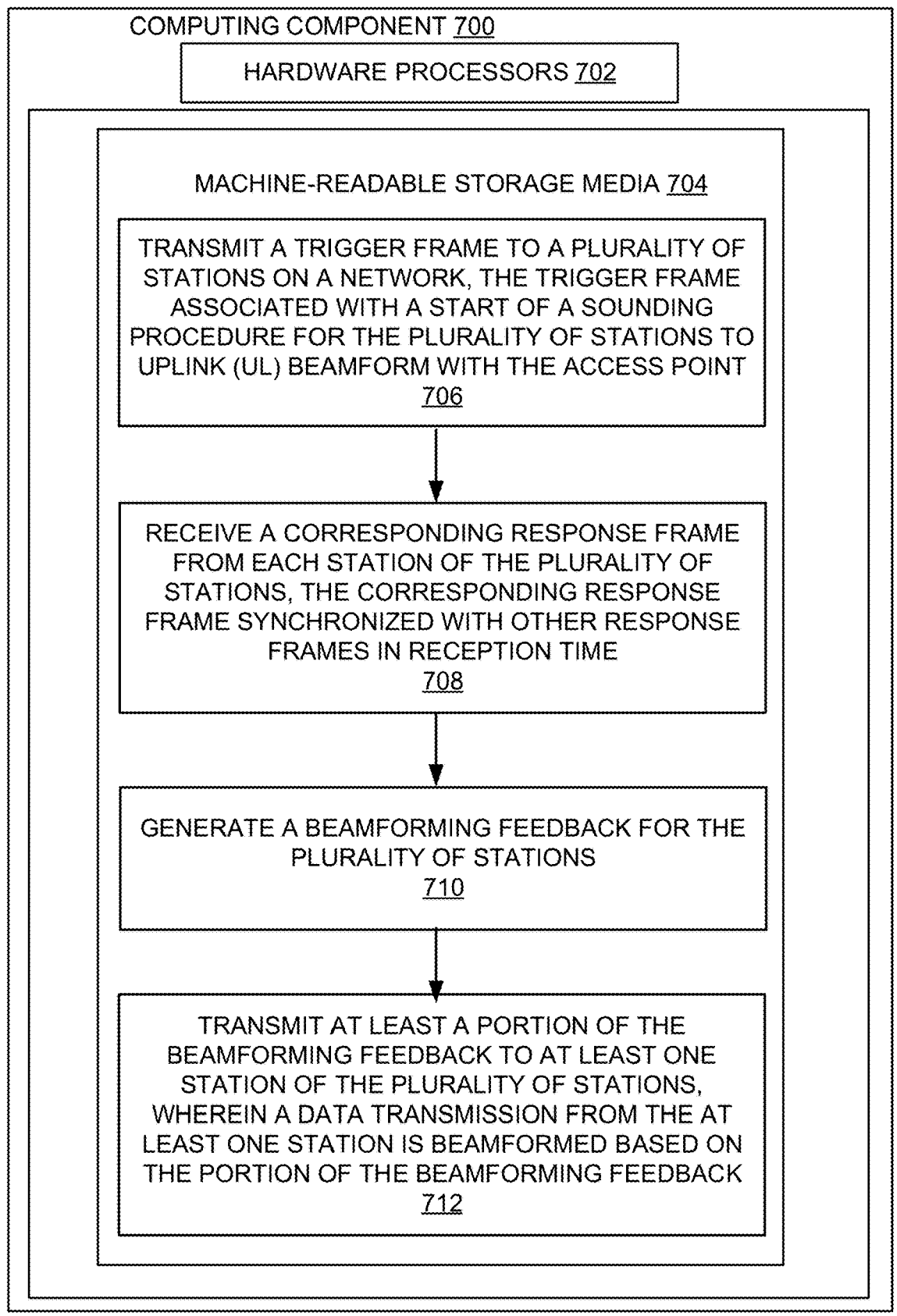
FIG. 7 is an exemplary flowchart, depicting a set of executable instructions stored in machine-readable storage media that, when executed, cause one or more hardware processors to perform an illustrative method for synchronizing UL beamforming channel sounding procedures, according to embodiments of the present disclosure.

FIG. 7 depicts a computing component 700 that includes one or more hardware processors 702 and machine-readable storage media 704 storing a set of machine-readable/machine-executable instructions that, when executed, cause the hardware processors 702 to perform an illustrative method for synchronizing UL beamforming channel sounding procedures. The computing component 700 may be implemented, for example, as the computing system 800 depicted in FIG. 8 or another computing device or system described herein, such as the computing system 111 in FIGS. 1A-1C. The hardware processors 702 may include, for example, the processor(s) 804 depicted in FIG. 8 or any other processing unit described herein. The machine-readable storage media 704 may include the main memory 806, the read-only memory (ROM) 808, the storage 810, or any other suitable machine-readable storage media described herein.

At block 706, in example embodiments, instructions may be executed by the hardware processors 702 to transmit a trigger frame to a plurality of stations on a network, as illustrated in FIGS. 3A and 3B. The trigger frame can be associated with a start of a sounding procedure for the plurality of stations to uplink (UL) beamform with the access point. In some embodiments, the trigger frame may include the NDPR trigger 302 in FIG. 3A or the NDPR trigger 352 in FIG. 3B. The NDPR triggers 302 and 352, as described in reference to FIGS. 3A and 3B, respectively, may be transmitted by the access point to multiple client devices at the same, or substantially the same, time. This simultaneous transmission avoids delays that would otherwise be inevitable in transmitting to multiple stations, thereby ensuring minimal latency in data transmission and reaping benefits of beamforming while avoiding interference.

At block 708, in example embodiments, instructions may be executed by the hardware processors 702 to receive a corresponding response frame from each station of the plurality of stations, as illustrated in FIGS. 3A and 3B. For example, the response frame may be implemented as NDPs 304 and 306 of FIG. 3A and NDPAs 354 and 356, followed by NDPs 358 and 360 in FIG. 3B, and may include a preamble from each station. Each preamble may contain information so that the response frame is synchronized in time, frequency and amplitude (e.g., power) upon receipt at the antennae of the access point. Each preamble may further identify the sub-channels and format of the packet. In MU OFDMA, each preamble may be transmitted over a full 20 MHz channel.

At block 710, in example embodiments, instructions may be executed by the hardware processors 702 to generate beamforming feedback for the plurality of stations. In some embodiments, the generation of beamforming feedback may be accomplished by analyzing OFDM training fields in the received response frame. The beamforming feedback may be manifested as a beamforming feedback report, for example, the beamforming feedback report 308 in FIGS. 3A and 3B. The beamforming feedback report may have dimensions of n by m, wherein n is a number of antennae at a station and m is a number of antennae at the access point. Each station may receive a different beamforming feedback report. The beamforming feedback report may be determined, at least in part, based on received power and phase shifts between pairs of beamformer and beamformee antennae.

At block 712, in example embodiments, instructions may be executed by the hardware processors 702 to transmit at least a portion of the beamforming feedback (e.g., beamforming feedback report 308 in FIGS. 3A and 3B) to at least one station of the plurality of stations. In some examples, the access point can transmit only a compressed version of the beamforming feedback report 308 to each of the client devices. In some examples, alternatively or additionally, the network device can transmit angles in a format of a string of bits, and the client devices may delimit the angles transmitted by the network device. A data transmission from the at least one station can be beamformed based on the portion of the beamforming feedback.

Figure 8:
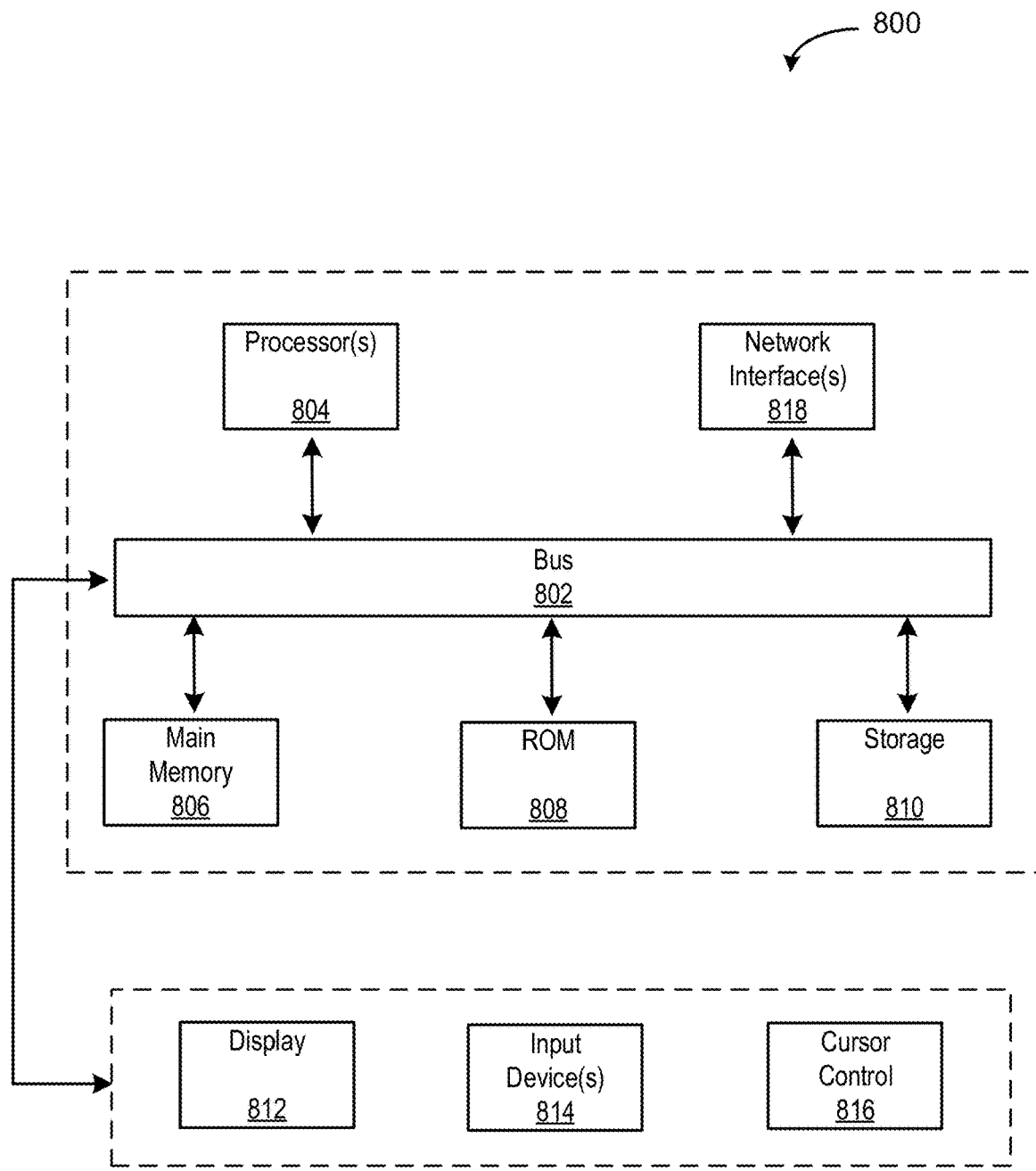
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "engine," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

As alluded to above, the terms "client device" and "station" may be interchangeable. In some scenarios, the terms "client device," "station," and "beamformer" may be interchangeable. In some scenarios, the terms "network device" and "beamformee" may be interchangeable.

What is claimed is:

1. A computer-implemented method, comprising:
    transmitting, by an access point, a trigger frame to a plurality of stations on a network, the trigger frame associated with a start of a sounding procedure for the plurality of stations to uplink (UL) beamform with the access point, wherein
        the trigger frame contains parameters for sounding the plurality of stations;
    receiving, by the access point, a corresponding response frame from each station of the plurality of stations, the corresponding response frame synchronized with other response frames in reception time, wherein:
        the corresponding response frame includes a null data packet announcement (NDPA) frame prior to a null data packet (NDP) frame,
        the NDPA frame contains parameters for sounding a station of the plurality of stations, and
        the parameters contained in the trigger frame are overridden by parameters contained in the NDPA frame based on at least one limitation associated with the station;
    generating, by the access point, a beamforming feedback for the plurality of stations; and
    transmitting, by the access point, at least a portion of the beamforming feedback to at least one station of the plurality of stations, wherein a data transmission from the at least one station is beamformed based on the portion of the beamforming feedback.

2. The computer-implemented method of claim 1, wherein:
    the trigger frame includes a list of stations to trigger, and
    the corresponding response frame is transmitted by each station based on a determination that the station is included in the list of stations.

3. The computer-implemented method of claim 1, wherein:
    the trigger frame contains parameters for sounding the plurality of stations, and
    the corresponding response frame includes the NDP frame.

4. The computer-implemented method of claim 1, wherein the NDPA frame and the NDP frame are received by the access point over different variants of uplink (UL) multi-user (MU) multiple input, multiple output (MIMO) or UL MU orthogonal frequency division multiple access (OFDMA).

5. The computer-implemented method of claim 1, wherein the trigger frame indicates that the sounding procedure comprises at least one of full bandwidth sounding or partial bandwidth sounding.

6. The computer-implemented method of claim 5, wherein the trigger frame indicates the full bandwidth sounding using UL MU MIMO, and wherein the method further comprises:
    grouping, by the access point, at least some stations of the plurality of stations such that the at least some stations share spatial streams and NDP frames associated with the at least some stations are transmitted on all subcarriers of a channel.

7. The computer-implemented method of claim 5, wherein the trigger frame indicates the partial bandwidth sounding using UL MU OFDMA, and wherein the method further comprises:
    grouping, by the access point, at least some stations of the plurality of stations such that the at least some stations share spatial streams and NDP frames associated with the at least some stations are transmitted on a subset of subcarriers of a channel.

8. The computer-implemented method of claim 1, wherein the NDP frame comprises training fields that the access device uses to calculate the beamforming feedback.

9. The computer-implemented method of claim 1, wherein the parameters of the NDPA frame comprises a station identifier and a number of columns in a feedback matrix corresponding with the beamforming feedback.

10. The computer-implemented method of claim 1, wherein, upon receiving the beamforming feedback, the at least one station of the plurality of stations determines a steering matrix based on the beamforming feedback.

11. The computer-implemented method of claim 1, wherein the sounding procedure is started for at least a portion of the plurality of stations simultaneously by the access point.

12. The computer-implemented method of claim 1, wherein the sounding procedure is initiated every 500 milliseconds.

13. The computer-implemented method of claim 1, wherein the plurality of stations are grouped based on predictions of future transmissions of data using historical frequency or intervals between which each of the plurality of stations transmit data.

14. The computer-implemented method of claim 1, wherein the beamforming feedback is a beamforming feedback report transmitted as a payload of a frame, wherein the beamforming feedback report comprises antennae weights for each of the plurality of stations.

15. A system comprising:
    at least one processor; and
    a memory storing instructions that, when executed by the at least one processor, cause the system to perform a method comprising:
        transmitting, by an access point, a trigger frame to a plurality of stations on a network, the trigger frame associated with a start of a sounding procedure for the plurality of stations to uplink (UL) beamform with the access point, wherein the trigger frame contains parameters for sounding the plurality of stations;
        receiving, by the access point, a corresponding response frame from each station of the plurality of stations, the corresponding response frame synchronized with other response frames in reception time, wherein:
- the corresponding response frame includes a null data packet announcement (NDPA) frame prior to a null data packet (NDP) frame,
- the NDPA frame contains parameters for sounding a station of the plurality of stations, and
- the parameters contained in the trigger frame are overridden by parameters contained in the NDPA frame based on at least one limitation associated with the station;

generating, by the access point, a beamforming feedback for the plurality of stations; and transmitting, by the access point, at least a portion of the beamforming feedback to at least one station of the plurality of stations, wherein a data transmission from the at least one station is beamformed based on the portion of the beamforming feedback.

16. The system of claim 15, wherein:
the trigger frame includes a list of stations to trigger, and
the corresponding response frame is transmitted by each station based on a determination that the station is included in the list of stations.

17. The system of claim 15, wherein:
the trigger frame contains parameters for sounding the plurality of stations, and
the corresponding response frame includes the NDP frame.

18. A non-transitory computer-readable storage medium including instructions that, when executed by at least one processor of a computing system, cause the computing system to perform a method comprising:
transmitting, by an access point, a trigger frame to a plurality of stations on a network, the trigger frame associated with a start of a sounding procedure for the plurality of stations to uplink (UL) beamform with the access point, wherein the trigger frame contains parameters for sounding the plurality of stations;

receiving, by the access point, a corresponding response frame from each station of the plurality of stations, the corresponding response frame synchronized with other response frames in reception time, wherein:
- the corresponding response frame includes a null data packet announcement (NDPA) frame prior to a null data packet (NDP) frame,
- the NDPA frame contains parameters for sounding a station of the plurality of stations, and
- the parameters contained in the trigger frame are overridden by parameters contained in the NDPA frame based on at least one limitation associated with the station;

generating, by the access point, a beamforming feedback for the plurality of stations; and transmitting, by the access point, at least a portion of the beamforming feedback to at least one station of the plurality of stations, wherein a data transmission from the at least one station is beamformed based on the portion of the beamforming feedback.

19. The non-transitory computer-readable storage medium of claim 18, wherein:
the trigger frame includes a list of stations to trigger, and
the corresponding response frame is transmitted by each station based on a determination that the station is included in the list of stations.

20. The non-transitory computer-readable storage medium of claim 18, wherein:
the corresponding response frame includes the NDP frame.

* * * * *